US012566389B2

(12) United States Patent
Takeuchi

(10) Patent No.: US 12,566,389 B2
(45) Date of Patent: Mar. 3, 2026

(54) IMAGE FORMING APPARATUS

(71) Applicant: CANON KABUSHIKI KAISHA, Tokyo (JP)

(72) Inventor: Kosuke Takeuchi, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/791,763

(22) Filed: Aug. 1, 2024

(65) Prior Publication Data

US 2025/0053114 A1 Feb. 13, 2025

(30) Foreign Application Priority Data

Aug. 9, 2023 (JP) ................................ 2023-130216
Jun. 11, 2024 (JP) ................................ 2024-094068

(51) Int. Cl.
*G03G 15/08* (2006.01)
*G03G 15/06* (2006.01)

(52) U.S. Cl.
CPC ....... *G03G 15/065* (2013.01); *G03G 15/0808* (2013.01)

(58) Field of Classification Search
None
See application file for complete search history.

(56) References Cited

U.S. PATENT DOCUMENTS

2004/0002015 A1* 1/2004 Ozawa .............. G03G 15/0907 399/53
2004/0022549 A1* 2/2004 Ozawa .............. G03G 15/0815 399/55
2005/0277044 A1* 12/2005 Watanabe .......... G03G 9/08726 430/109.3
2017/0269508 A1* 9/2017 Shimizu ............ G03G 15/0907
2020/0292967 A1* 9/2020 Kobayashi .......... G03G 15/095
2025/0053131 A1* 2/2025 Okuyama .......... G03G 21/0047

FOREIGN PATENT DOCUMENTS

JP S63293571 A * 11/1988
JP H10207228 A 8/1998
JP 2010230941 A * 10/2010
JP 2020079815 A 5/2020
JP 2020148920 A 9/2020

OTHER PUBLICATIONS

Machine translation of 田淵 健二 (1988).*
Machine translation of Nobuyuki (2010).*

* cited by examiner

*Primary Examiner* — Sevan A Aydin
(74) *Attorney, Agent, or Firm* — ROSSI, KIMMS & McDOWELL LLP

(57) ABSTRACT

A carrier collecting device includes a rotatable sleeve and a magnet non-rotatably disposed inside the sleeve, and collects the carrier on the image bearing member. A first bias is applied to the sleeve during the image forming operation. A second bias is applied to the sleeve in a predetermined mode during non-image forming. When, a duration of a voltage of a reverse polarity to a charging polarity of the toner is t1, a duration of a voltage of a same polarity as the charging polarity of the toner is t2, and a ratio of t1 with respect to one period (t1+t2) of the AC voltage of the bias applied to the sleeve is a duty ratio, a duty ratio of the AC voltage of the second bias is lower than a duty ratio of the AC voltage of the first bias.

19 Claims, 23 Drawing Sheets

IMAGE FORMING APPARATUS

BACKGROUND OF THE INVENTION

Field of the Invention

The present invention relates to an image forming apparatus such as a copying machine, a printer, a facsimile, and a multifunction peripheral having a plurality of functions thereof.

Description of the Related Art

Hitherto, as an image forming apparatus, a configuration in which a toner image is formed using a two-component developer containing a nonmagnetic toner and a magnetic carrier is known. In this configuration, normally, the electrostatic latent image on the photosensitive drum is developed as a toner image with toner in the developing step, but carriers may also adhere to the photosensitive drum at a certain ratio (carrier adhesion). Since occurrence of carrier adhesion affects an output image, for example, US2020/0292967 discloses a configuration including a carrier collecting device that collects a carrier adhering to a photosensitive drum.

The carrier collecting device described in US2020/0292967 includes a collecting roller and a magnet roller provided in the collecting roller, and further applies a voltage obtained by superimposing a DC voltage and an AC voltage to the collecting roller. As a result, the carrier on the photosensitive drum is collected to the collecting roller by the magnetic force of the magnet roller and the electrostatic force due to the applied voltage. When the carrier is collected by the carrier collecting device as described above, some toner may also be collected by the collecting roller. Therefore, in the case of the configuration described in US2020/0292967, the toner removal mode is executed during non-image forming, and in the toner removal mode, the rotational speed of the photosensitive drum is made lower than that during image forming, and an AC voltage is applied to the collecting roller to return the toner adhering to the collecting roller to the photosensitive drum.

In a case where the rotational speed of the photosensitive drum is reduced in the toner removal mode as in the configuration described in US2020/0292967, it is necessary to change the rotational speed of the photosensitive drum between the time of image forming and the time of execution of the toner removal mode. For this reason, the execution time of the toner removal mode becomes long, and the downtime, which is a time during which image forming cannot be performed, increases accordingly. On the other hand, in a case where the toner removal mode is performed without reducing the rotational speed of the photosensitive drum, it is necessary to increase the execution time of the toner removal mode in order to sufficiently remove the toner adhering to the collecting roller, and as a result, the downtime increases.

The present invention provides a configuration capable of improving toner removal efficiency of a collecting roller while suppressing downtime.

SUMMARY OF THE INVENTION

According to a first aspect of the present invention, an image forming apparatus is configured to execute an image forming operation. The image forming apparatus includes a rotatable image bearing member on which an electrostatic latent image is formed, a developing unit including a developer container that accommodates a developer including a toner and a carrier, and a developer bearing member that bears the developer to develop the electrostatic latent image formed on the image bearing member into a toner image, a transfer member to which the toner image borne on the image bearing member is transferred, a carrier collecting device that includes a rotatable sleeve disposed to face the image bearing member and a magnet non-rotatably disposed inside the sleeve, and collects the carrier on the image bearing member, a bias application unit that applies a bias including an AC voltage to the sleeve, and, a controller that controls the bias application unit. The sleeve is disposed downstream of a development position at which the electrostatic latent image formed on the image bearing member is developed and upstream of a transfer position at which the toner image borne on the image bearing member is transferred to the transfer member, in a rotation direction of the image bearing member. The controller controls the bias application unit to apply a first bias to the sleeve during the image forming operation, and controls the bias application unit to apply a second bias to the sleeve in a predetermined mode during non-image forming. When, in one period of the AC voltage of the bias applied to the sleeve by the bias application unit, a duration of a voltage of a reverse polarity to a charging polarity of the toner with respect to a DC potential of the sleeve is t1, a duration of a voltage of a same polarity as the charging polarity of the toner with respect to the DC potential of the sleeve is t2, and a ratio of t1 with respect to one period (t1+t2) of the AC voltage of the bias applied to the sleeve by the bias application unit is a duty ratio, a duty ratio of the AC voltage of the second bias is lower than a duty ratio of the AC voltage of the first bias.

According to a second aspect of the present invention, an image forming apparatus is configured to execute an image forming operation. The image forming apparatus includes a rotatable image bearing member on which an electrostatic latent image is formed, a developing unit including a developer container that accommodates a developer including a toner and a carrier, and a developer bearing member that bears the developer to develop the electrostatic latent image formed on the image bearing member into a toner image, a transfer member to which the toner image borne on the image bearing member is transferred, a carrier collecting device that includes a rotatable sleeve disposed to face the image bearing member and a magnet non-rotatably disposed inside the sleeve, and collects the carrier on the image bearing member, a bias application unit that applies a bias including an AC voltage to the sleeve, and, a controller that controls the bias application unit. The sleeve is disposed downstream of a development position at which the electrostatic latent image formed on the image bearing member is developed and upstream of a transfer position at which the toner image borne on the image bearing member is transferred to the transfer member, in a rotation direction of the image bearing member. The controller controls the bias application unit to apply a first bias to the sleeve during the image forming operation, and controls the bias application unit to apply a second bias to the sleeve in a predetermined mode during non-image forming. When, in one period of the AC voltage of the bias applied to the sleeve by the bias application unit, a duration of a voltage of a reverse polarity to a charging polarity of the toner with respect to a DC potential of the sleeve is t1, a duration of a voltage of a same polarity as the charging polarity of the toner with respect to the DC potential of the sleeve is t2, and a ratio of t1 with respect to one period (t1+t2) of an AC voltage of the bias applied to the sleeve by the bias application unit is a duty ratio, a duty ratio of the AC voltage of the second bias is lower than 50%.

According to a third aspect of the present invention, an image forming apparatus is configured to execute an image forming operation. The image forming apparatus includes a rotatable image bearing member on which an electrostatic latent image is formed, a developing unit including a developer container that accommodates a developer including a toner and a carrier, and a developer bearing member that bears the developer to develop the electrostatic latent image formed on the image bearing member into a toner image, a transfer member to which the toner image borne on the image bearing member is transferred, a carrier collecting device that includes a rotatable sleeve disposed to face the image bearing member and a magnet non-rotatably disposed inside the sleeve, and collects the carrier on the image bearing member, a bias application unit that applies a bias in which a DC voltage and an AC voltage are superimposed to the sleeve, and, a controller that controls the bias application unit. The sleeve is disposed downstream of a development position at which the electrostatic latent image formed on the image bearing member is developed and upstream of a transfer position at which the toner image borne on the image bearing member is transferred to the transfer member, in a rotation direction of the image bearing member. The controller controls the bias application unit to apply a first bias to the sleeve during the image forming operation, and controls the bias application unit to alternately apply a second bias and a third bias to the sleeve in a predetermined mode during non-image forming. A polarity of the DC voltage of the first bias is the same as a charging polarity of the toner. The second bias is a bias that is superimposed with the DC voltage at which a polarity of a potential of the sleeve with respect to the image bearing member is negative and the AC voltage. The third bias is a bias that is superimposed with the DC voltage at which the polarity of the potential of the sleeve with respect to the image bearing member is positive and the AC voltage.

Further features of the present invention will become apparent from the following description of exemplary embodiments with reference to the attached drawings.

DESCRIPTION OF THE EMBODIMENTS

First Embodiment

Figure 1:
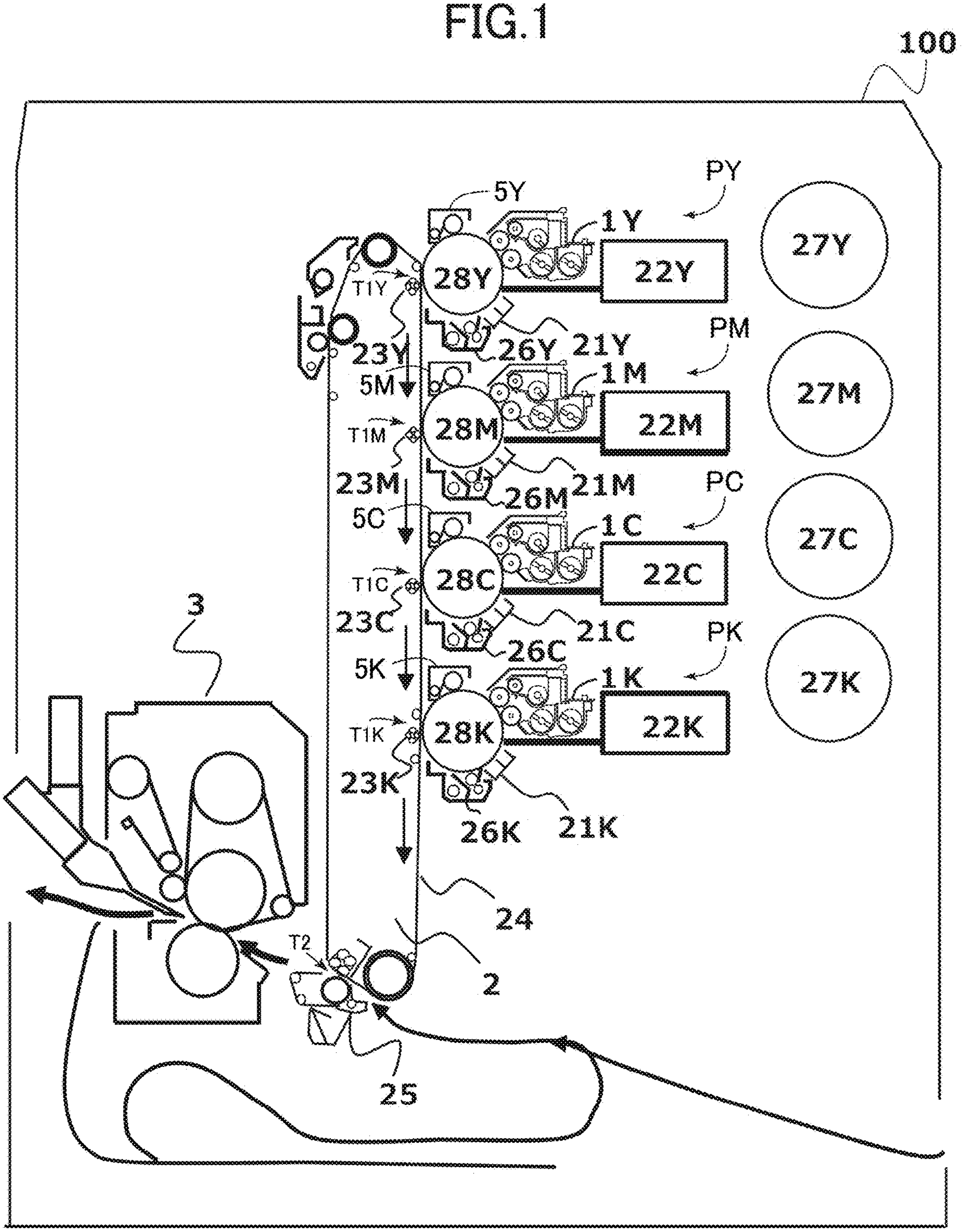
FIG. 1 is a schematic cross-sectional view of a configuration of an image forming apparatus according to a first embodiment.
Figure 2:
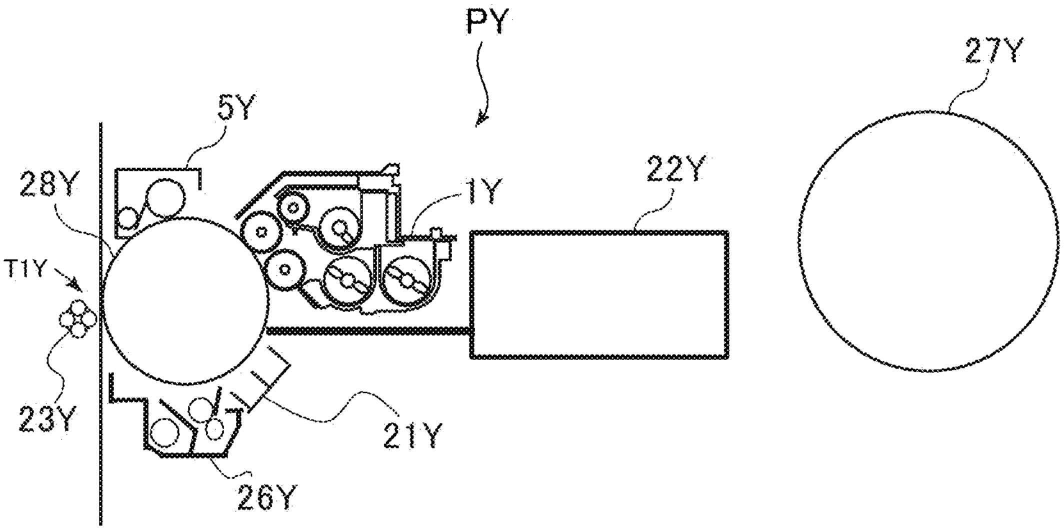
FIG. 2 is a schematic cross-sectional view of a configuration of the periphery of a photosensitive drum according to the first embodiment.
Figure 3:
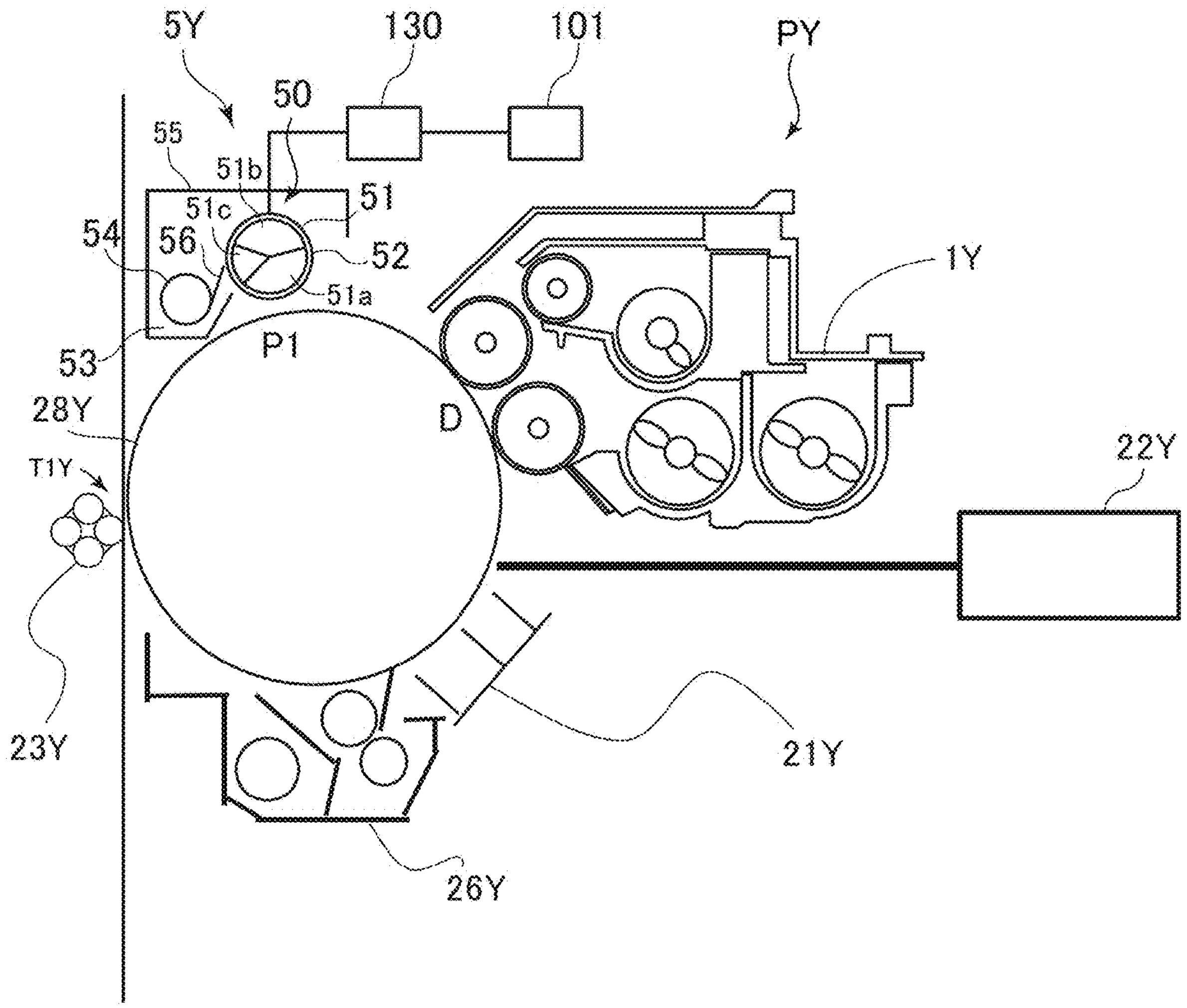
FIG. 3 is a schematic cross-sectional view of a configuration of the image forming unit according to the first embodiment.

A first embodiment will be described with reference to FIGS. 1 to 13. First, a schematic configuration of an image forming apparatus 100 of the present embodiment will be described with reference to FIGS. 1 to 3. Note that FIG. 1 is a schematic cross-sectional view of a configuration of the entire image forming apparatus 100, FIG. 2 is a schematic cross-sectional view of a configuration of the periphery of a photosensitive drum 28Y in an image forming unit PY, and FIG. 3 is a schematic cross-sectional view of a configuration of the image forming unit PY.

Image Forming Apparatus

The image forming apparatus 100 is a full-color image forming apparatus, and in the case of the present embodiment, for example, is a multi-function peripheral (MFP) having a copy function, a printer function, and a scan function. The image forming apparatus 100 forms a toner image on a recording material according to image information from an external device such as a document reading apparatus connected to an image forming apparatus body or a personal computer (PC) communicably connected to the image forming apparatus body. As illustrated in FIG. 1, the image forming apparatus 100 includes image forming units PY, PM, PC, and PK that perform image forming processes of toner images of four colors of yellow, magenta, cyan, and black, respectively, in parallel.

The image forming units PY, PM, PC, and PK of the respective colors include primary chargers 21Y, 21M, 21C, and 21K, developing units 1Y, 1M, 1C, and 1K, optical writing units (exposing units) 22Y, 22M, 22C, and 22K, photosensitive drums 28Y, 28M, 28C, and 28K, cleaning devices 26Y, 26M, 26C, and 26K, and carrier collecting devices 5Y, 5M, 5C, and 5K. The image forming apparatus 100 includes a transfer device 2 and a fixing unit 3. Since the configurations of the image forming units PY, PM, PC, and PK of the respective colors are similar, the image forming unit PY will be representatively described below.

The photosensitive drum 28Y serving as an image bearing member that bears an electrostatic latent image on its surface is a photosensitive member having a photosensitive layer made of resin such as polycarbonate containing an organic photoconductor (OPC), and is configured to rotate at a predetermined speed. The primary charger 21Y includes a corona discharge electrode disposed around the photosensitive drum 28Y, and charges the surface of the photosensitive drum 28Y with generated ions.

The optical writing unit 22Y incorporates a scanning optical device, and exposes the photosensitive drum 28Y charged based on image data to lower the potential of the exposed portion, thereby forming a charge pattern (electrostatic latent image) corresponding to the image data. The developing unit 1Y transfers the accommodated developer to the photosensitive drum 28Y at a developing portion D (see FIG. 3) facing the photosensitive drum 28Y to develop the electrostatic latent image formed on the photosensitive drum 28Y. The developer is formed by mixing a carrier and a toner corresponding to each color, and the electrostatic latent image is visualized by the toner.

The transfer device 2 includes primary transfer rollers 23Y, 23M, 23C, and 23K, an intermediate transfer belt 24 serving as an intermediate transfer body (transfer member), and a secondary transfer roller 25. The intermediate transfer belt 24 is wound by the primary transfer rollers 23Y, 23M, 23C, and 23K and a plurality of rollers, and is supported so as to be able to travel. The primary transfer rollers 23Y, 23M, 23C, and 23K correspond to respective colors of yellow (Y), magenta (M), cyan (C), and black (K) in order from the top in FIG. 1. The secondary transfer roller 25 is disposed outside the intermediate transfer belt 24, and is configured to allow a recording material to pass between the secondary transfer roller and the intermediate transfer belt 24. Note that the recording material is, for example, a sheet such as a paper sheet or a plastic sheet.

The toner images of the respective colors formed on the photosensitive drums 28Y, 28M, 28C, and 28K are sequentially primarily transferred onto the intermediate transfer belt 24 by the primary transfer rollers 23Y, 23M, 23C, and 23K in the primary transfer portions T1Y, T1M, T1C, and T1K serving as transfer portions, and a color toner image in which the respective layers of yellow, magenta, cyan, and black are superimposed is formed. The formed toner image is transferred to a recording material conveyed from a cassette or the like containing the recording material by the secondary transfer roller 25 in the secondary transfer portion T2. Pressure and heat are applied to the recording material to which the toner image is transferred in the fixing unit 3. As a result, the toner on the recording material is melted, and the color image is fixed to the recording material.

The surfaces of the photosensitive drums 28Y, 28M, 28C, and 28K after the toner images are primarily transferred to the intermediate transfer belt 24 are cleaned by the cleaning devices 26Y, 26M, 26C, and 26K, respectively. The cleaning devices 26Y, 26M, 26C, and 26K clean the surfaces of the photosensitive drums 28Y, 28M, 28C, and 28K by, for example, bringing cleaning blades into contact with the surfaces of the photosensitive drums 28Y, 28M, 28C, and 28K, respectively. The photosensitive drums 28Y, 28M, 28C, and 28K whose surfaces have been cleaned are prepared for the next image forming process.

As illustrated in FIGS. 2 and 3, the carrier collecting devices 5Y, 5M, 5C, and 5K collect carriers adhering to the photosensitive drums 28Y, 28M, 28C, and 28K downstream of the developing portion D and upstream of the primary transfer portions T1Y, T1M, T1C, and T1K, respectively, in the rotation direction of the photosensitive drums 28Y, 28M, 28C, and 28K. As illustrated in FIG. 3, each of the carrier collecting devices 5Y, 5M, 5C, and 5K includes a collecting roller 52 that is disposed to face the photosensitive drums 28Y, 28M, 28C, and 28K and rotates, and a magnet roller 51 serving as a magnetic field generating unit that is disposed inside the collecting roller 52 in a non-rotating manner and adsorbs carriers to the surface of the collecting roller 52 by magnetic force. The carrier collecting devices 5Y, 5M, 5C, and 5K will be described later in detail.

The developer storages 27Y, 27M, 27C, and 27K are provided corresponding to the developing units 1Y, 1M, 1C, and 1K, respectively, and bottles accommodating developers corresponding to respective colors of yellow, magenta, cyan, and black are replaceably loaded in order from the top. The developer storages 27Y, 27M, 27C, and 27K are configured to be able to convey (replenish) the developers to the developing units 1Y, 1M, 1C, and 1K corresponding to the colors of the accommodated developers.

For example, the toner weight ratio of the developer accommodated in the bottle is 80 to 95%, and the toner weight ratio of the developer accommodated in the developing units 1Y, 1M, 1C, and 1K is 5 to 10%. Therefore, when the toner is consumed by the development in the developing units 1Y, 1M, 1C, and 1K, the developer containing the toner corresponding to the consumption amount is replenished, and the toner weight ratio of the developer in the developing units 1Y, 1M, 1C, and 1K is maintained constant.

Developing Unit

Figure 4:
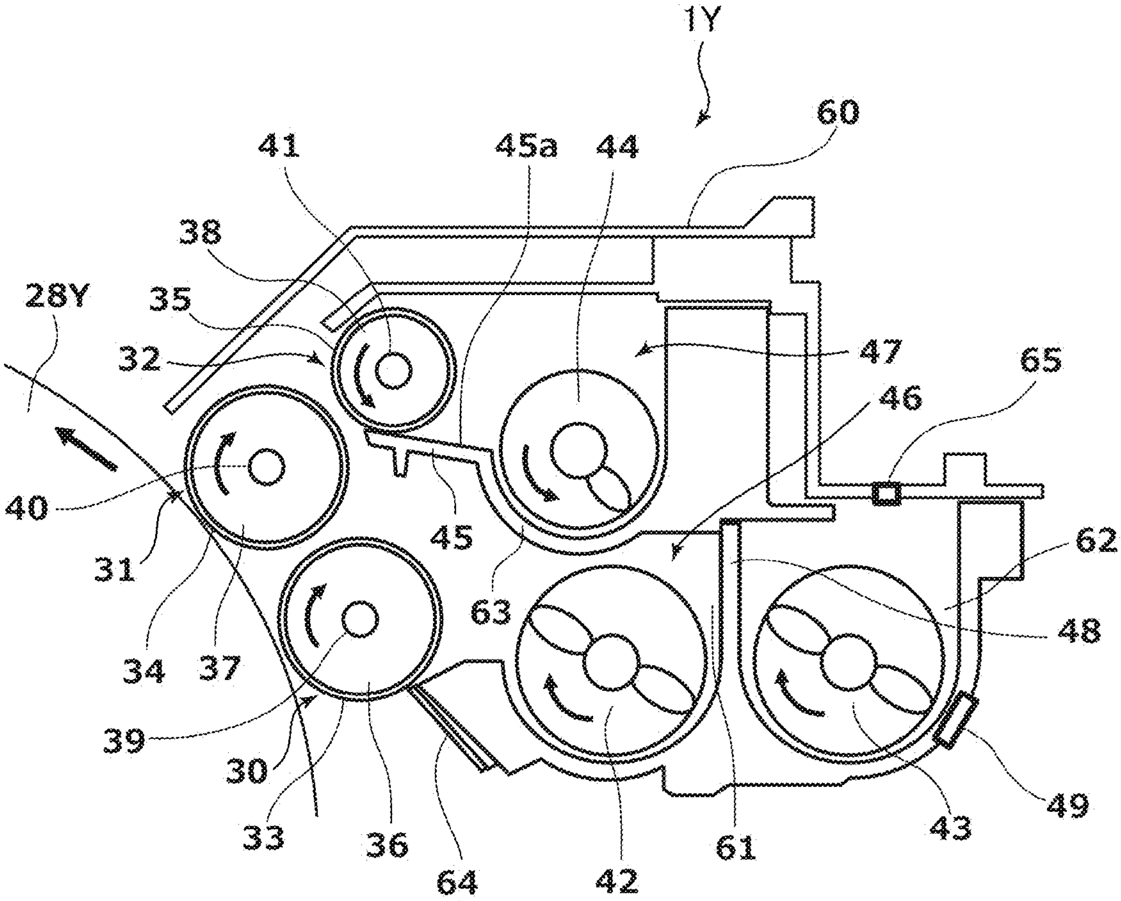
FIG. 4 is a schematic cross-sectional view of a configuration of a developing unit according to the first embodiment.

Next, the developing units 1Y, 1M, 1C, and 1K will be described with reference to FIG. 4. Since the configurations of the developing units 1Y, 1M, 1C, and 1K are the same, the developing unit 1Y will be representatively described below.

The developing unit 1Y includes a first developing roller 30, a second developing roller 31, a peeling roller 32, a developer supply screw 42, a developer stirring screw 43, and a developer collecting screw 44, and these members are housed in a developer container 60.

The first developing roller 30 is a developer bearing member that is rotationally driven, and is disposed at a position adjacent to the photosensitive drum 28Y such that the rotational axis thereof is substantially parallel to the rotational axis of the photosensitive drum 28Y. The first developing roller 30 includes a rotating first sleeve 33 and a first magnet (fixed magnet) 36 that is disposed inside the first sleeve 33 in a non-rotating manner and adsorbs the developer to the surface of the first sleeve 33 by magnetic force. Then, the first developing roller 30 adsorbs (bears) the developer pumped up from the developer supply screw 42 based on magnetic force, and develops the electrostatic latent image formed on the rotating photosensitive drum 28Y (on the image bearing member) with the developer.

The first sleeve 33 is a non-magnetic cylindrical member, and is rotationally driven around the rotation shaft 39. The rotation direction of the first sleeve 33 is a clockwise direction as indicated by an arrow in FIG. 4, and is a direction opposite to the rotation direction of the photosensitive drum 28Y in the present embodiment. Therefore, the first sleeve 33 and the photosensitive drum 28Y rotate in the same direction at positions facing each other.

The first magnet 36 is disposed inside the first sleeve 33 and has a plurality of sectored magnetic poles and a sectored non-magnetic pole portion. A space that allows rotation of the first sleeve 33 is disposed between the inner periphery of the first sleeve 33 and the outer periphery of the first magnet 36.

The developer adsorbed onto the first sleeve 33 is conveyed toward the photosensitive drum 28Y by the rotation operation of the first sleeve 33, and develops the latent image formed on the photosensitive drum 28Y. After the latent image formed on the photosensitive drum 28Y is developed, the developer on the first sleeve 33 is conveyed to the vicinity of the second developing roller 31 by the rotation operation of the first sleeve 33. Then, in the vicinity of the closest position between the first developing roller 30 and the second developing roller 31, the developer is peeled off from the first sleeve 33 by the magnetic field generated in the first magnet 36 included in the first developing roller 30 and the second magnet 37 included in the second developing roller 31, and is delivered onto the second sleeve 34.

The second developing roller 31 is a developer bearing member that is rotationally driven, is disposed downstream of the first developing roller 30 in the rotation direction of the photosensitive drum 28Y and above the rotation center of the first developing roller 30 in the vertical direction, and receives the developer from the first developing roller 30 by magnetic force. Similarly to the first developing roller 30, the second developing roller 31 is disposed at a position adjacent to the photosensitive drum 28Y such that the rotational axis thereof is substantially parallel to the rotational axis of the photosensitive drum 28Y. Therefore, the rotational axes of the second developing roller 31 and the first developing roller 30 are substantially parallel to each other.

The second developing roller 31 includes a rotating second sleeve 34 and a second magnet (fixed magnet) 37 that is disposed inside the second sleeve 34 in a non-rotating manner and adsorbs the developer to the surface of the second sleeve 34 by magnetic force. Then, the second developing roller 31 receives the developer from the first developing roller 30 (first sleeve 33) based on the magnetic force, adsorbs (bears) the developer, and develops the electrostatic latent image formed on the rotating photosensitive drum 28Y with the developer. The peeling roller 32 to be described later is located on the side of the second developing roller 31.

The second sleeve 34 is a non-magnetic cylindrical member, and is rotationally driven around the rotation shaft 40. The rotation direction of the second sleeve 34 is a clockwise direction as indicated by an arrow in FIG. 4, and is a direction opposite to the rotation direction of the photosensitive drum 28Y in the present embodiment. Therefore, the second sleeve 34 and the photosensitive drum 28Y rotate in the same direction at positions facing each other. The second sleeve 34 and the first sleeve 33 rotate in opposite directions at positions facing each other.

The second magnet 37 is disposed inside the second sleeve 34 and has a plurality of sectored magnetic poles and a sectored non-magnetic pole portion. A space that allows rotation of the second sleeve 34 is disposed between the inner periphery of the second sleeve 34 and the outer periphery of the second magnet 37.

The developer adsorbed onto the second sleeve 34 is conveyed toward the photosensitive drum 28Y by the rotation operation of the second sleeve 34, and develops the latent image formed on the photosensitive drum 28Y. After the latent image formed on the photosensitive drum 28Y is developed, the developer remaining in the second sleeve 34 is conveyed to the vicinity of the peeling roller 32 by the rotation operation of the second sleeve 34. Then, in the vicinity of the closest position between the second developing roller 31 and the peeling roller 32, the developer is delivered from the second sleeve 34 to the third sleeve 35 of the peeling roller 32 by the magnetic field generated in the second magnet 37 included in the second developing roller 31 and the third magnet 38 included in the peeling roller 32.

The peeling roller 32 serving as a peeling portion is disposed on the side opposite to the photosensitive drum 28Y with respect to the rotation center of the second sleeve 34, and peels the developer after developing the electrostatic latent image on the photosensitive drum 28Y by the second developing roller 31 from the second developing roller 31. Specifically, the peeling roller 32 is a developer bearing member that is rotationally driven, and is disposed between the second developing roller 31 and the developer collecting screw 44 such that the rotation center thereof is above the rotation center of the second developing roller 31.

The peeling roller 32 is disposed such that the rotational axis thereof is substantially parallel to the rotational axis of the second developing roller 31. The peeling roller 32 includes a rotating third sleeve 35 and a third magnet (fixed magnet) 38 that is disposed inside the third sleeve 35 in a non-rotating manner and adsorbs the developer to the surface of the third sleeve 35 by magnetic force, and is configured to receive the developer from the second developing roller 31 based on the magnetic force.

The third sleeve 35 is a non-magnetic cylindrical member, and is rotationally driven around the rotation shaft 41. The rotation direction of the third sleeve 35 is a counterclockwise direction as indicated by an arrow in FIG. 4, and is a direction opposite to the rotation direction of the second sleeve 34 in the present embodiment. Therefore, the third sleeve 35 and the second sleeve 34 rotate in the same direction at positions facing each other.

The third magnet 38 is disposed inside the third sleeve 35 and has a plurality of sectored magnetic poles and a sectored non-magnetic pole portion. A space that allows rotation of the third sleeve 35 is disposed between the inner periphery of the third sleeve 35 and the outer periphery of the third magnet 38.

The developer adsorbed onto the third sleeve 35 is conveyed to the downstream side in the rotation direction by the rotation operation of the third sleeve 35, is peeled off from the third sleeve 35 by the third magnet 38 included in the peeling roller 32 at a position close to the developer collecting screw 44, and falls toward the guide member 45 positioned vertically downward by its own weight. Then, the developer dropped on the guide member 45 is guided by its own weight toward the developer collecting screw 44.

The guide member 45 and the developer collecting screw 44 constitute a developer collecting portion 47 serving as a collecting portion that collects the developer peeled off from the third sleeve 35 of the peeling roller 32. In the developer collecting portion 47, the developer collecting screw 44 is positioned below the rotation center of the peeling roller 32 in the vertical direction, and conveys the developer delivered (collected) from the peeling roller 32 while stirring the developer. The guide member 45 serving as a guide portion is disposed below the rotation center of the peeling roller 32 in the vertical direction, and guides the developer peeled off by the peeling roller 32 toward the developer collecting screw 44.

The developer collecting screw 44 serving as a collecting member and a conveying portion conveys the collected developer to a developer circulating portion 46 described below. That is, the developer collecting screw 44 is a screw conveying member used to convey the developer collected by sliding down the slope of the guide member 45 in one direction while stirring the developer.

The developer circulating portion 46 is a supply portion for supplying the developer to the first developing roller 30, and the developer circulating portion 46 includes a regulating member 64, a developer supply screw 42, and a developer stirring screw 43. In the developer circulating portion 46, the developer is supplied to the first developing roller 30 while being conveyed in the substantially horizontal direction while being stirred in the developer supply screw 42 and the developer stirring screw 43. As described above, the developer collected by the developer collecting portion 47 falls by its own weight and is introduced into the developer circulating portion 46. That is, the developer circulating portion 46 is positioned below the developer collecting portion 47 in the vertical direction.

The developer supply screw 42, the developer stirring screw 43, and the developer collecting screw 44 are screw conveying members that convey the developer in one direction while stirring the developer, and the developer supply screw 42 and the developer stirring screw 43 are positioned below the rotation center of the developer collecting screw 44 in the vertical direction. In addition, the developer supply screw 42, the developer stirring screw 43, and the developer collecting screw 44 are disposed such that the rotational axes thereof are substantially parallel to each other. The rotational axis of each screw is substantially parallel to the rotational axis of the first developing roller 30.

The developer supply screw 42 is positioned between the first developing roller 30 and the developer stirring screw 43, and a partition wall 48 of the developer container 60 is disposed between the developer supply screw 42 and the developer stirring screw 43. The partition wall 48 of the developer container 60 extends along the rotational axis direction of the developer supply screw 42 and the developer stirring screw 43. The partition wall 48 is provided with a communication port (not illustrated) that communicates the first conveyance path 61 through which the developer is conveyed by the developer supply screw 42 and the second conveyance path 62 through which the developer is conveyed by the developer stirring screw 43.

The developer stirred by the developer collecting screw 44 passes through a communication port (not illustrated) formed in a partition wall 63 of the developer container 60 between the developer collecting screw 44 and the developer supply screw 42, and drops toward the developer supply screw 42 by its own weight. The guide member 45 described above is formed integrally with the partition wall 63, and the developer collecting screw 44 is disposed above the partition wall 63.

The developer conveying directions of the developer supply screw 42 and the developer stirring screw 43 are opposite to each other. The starting end side (the upstream end side in the developer conveying direction) and the terminating end side (the downstream end side in the developer conveying direction) of the first conveyance path 61 in which the developer supply screw 42 is disposed communicate with the terminating end side and the starting end side of the second conveyance path 62 in which the developer stirring screw 43 is disposed via the communication port provided in the partition wall 48. Therefore, the developer circulates in a rotation direction of the developer supply screw 42 and the developer stirring screw 43 indicated by arrows in FIG. 4 and in a substantially horizontal direction in the developer container 60, and a part of the developer is supplied toward the first developing roller 30.

The developer replenishing port 65 is disposed above the developer stirring screw 43 in the developer container 60 and is connected to a developer storage 27Y (see FIG. 1). The developer replenishing port 65 is configured to be able to replenish the developer accommodated in the bottle loaded in the developer storage 27Y to the second conveyance path 62 in which the developer stirring screw 43 is disposed.

As described above, since the toner weight ratio of the developer accommodated in the bottle of the developer storage 27Y is larger than the toner weight ratio of the developer in the developing unit 1Y, the toner weight ratio of the developer in the developing unit 1 can be maintained constant by adjusting the amount of developer to be replenished to the developer stirring screw 43.

A toner density detection sensor 49 is disposed to detect the toner density in the developer included in the developer circulating portion 46. The toner density detection sensor 49 is a sensor that detects the magnetic permeability of the developer. Since the toner density corresponds to the amount of toner consumption in the developing unit 1Y, the toner density is used for controlling replenishment of developer from the developer storage 27Y. For example, when it is detected that the toner density is lower than a predetermined value, the developer is replenished from the developer storage 27Y. Since the permeability of the developer changes according to the toner density, the toner density can be detected using the permeability.

The regulating member 64 is disposed adjacent to the first developing roller 30, and is used to regulate the amount of developer supplied from the developer circulating portion 46 to the first developing roller 30. For example, the regulating member 64 can be configured to regulate the amount of the developer adsorbed to the first developing roller 30 based on the gap between the surface of the first sleeve 33 of the first developing roller 30 and the end of the regulating member 64.

In a circulation path of the developer in the developer container 60, the developer is conveyed in the substantially horizontal direction while being stirred in the developer circulating portion 46, is supplied to the first developing roller 30, and is delivered from the first developing roller 30 to the upper second developing roller 31 based on magnetic force. Next, the developer is delivered from the second developing roller 31 to the peeling roller 32 located on the side of the second developing roller 31 again based on magnetic force, and then peeled off from the peeling roller 32 by the third magnet 38 included in the peeling roller 32, and then collected by the developer collecting portion 47 and introduced again into the developer circulating portion 46.

As described above, in the present embodiment, the two-component development method is used as the development method, and a mixture of a nonmagnetic toner with which a normal charging polarity is negative and a carrier having magnetism is used as the developer. The nonmagnetic toner is obtained by incorporating a colorant, a wax component, or the like in a resin such as polyester or styrene acryl, pulverizing or polymerizing the resin into a powder, and adding a fine powder of titanium oxide, silica, or the like to the surface. The magnetic carrier is obtained by applying resin coating to a surface layer of a core composed of ferrite particles or resin particles obtained by kneading magnetic powder. The toner density (the weight ratio of the toner contained in the developer) in the developer in the initial state is 8% in the present embodiment.

The developing step of the developing unit 1Y will be further described. As described above, the developing unit 1Y conveys the developer to the developing region by the first sleeve 33 and the second sleeve 34. After the photosensitive drum 28Y is uniformly charged to a charging potential by a DC voltage applied to the primary charger 21Y or a voltage obtained by superimposing an AC voltage on the DC voltage, the image portion is exposed by the laser of the optical writing unit 22Y, and the potential at the exposed position becomes the exposure potential. By the electric field generated between the first sleeve 33 and the charging potential and the exposure potential on the photosensitive drum 28Y, and between the second sleeve 34 and the charging potential and the exposure potential on the photosensitive drum 28Y, the negative toner present in the developer is carried to the electrostatic latent image at which a potential on the photosensitive drum 28Y is the exposure potential and developed.

Control Configuration

Figure 5:
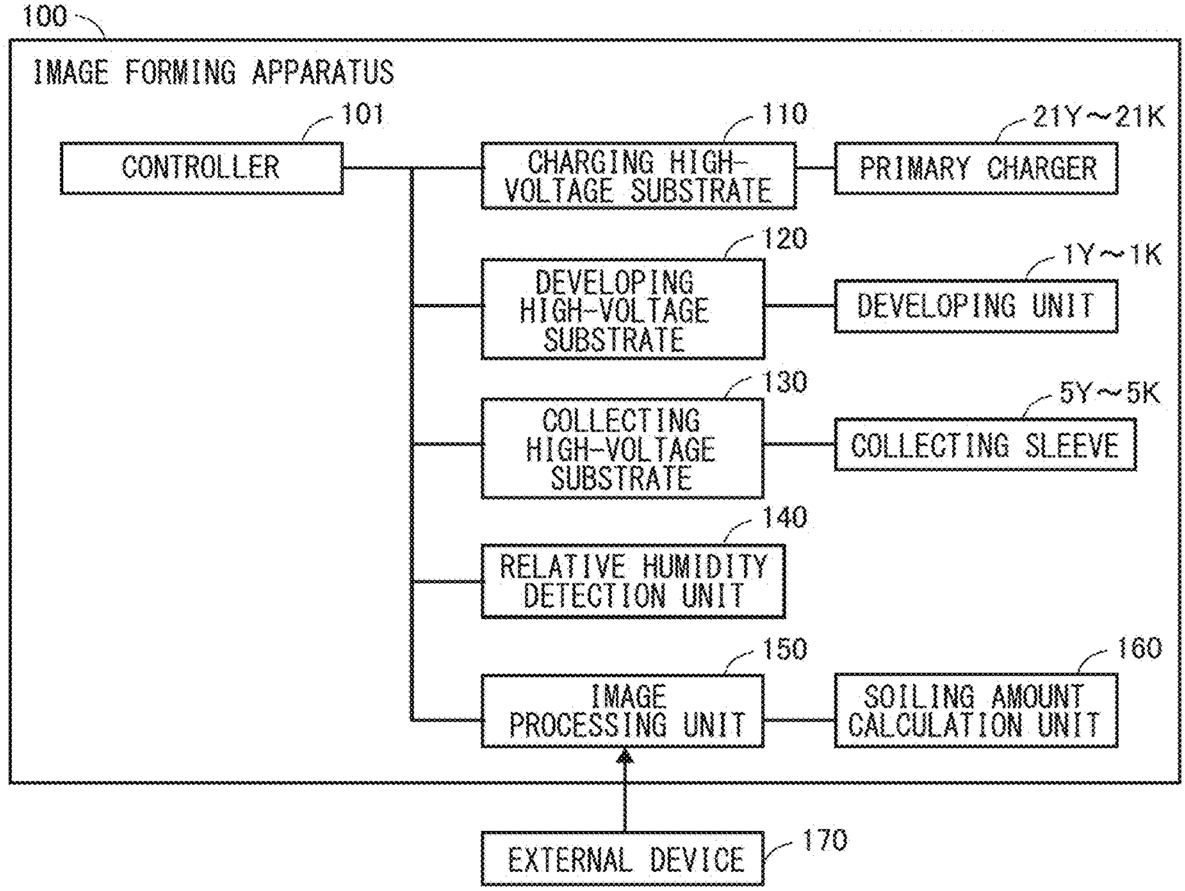
FIG. 5 is a control block diagram of the image forming apparatus according to the first embodiment.

FIG. 5 is a block diagram illustrating a part of a control configuration of the image forming apparatus 100 according to the present embodiment. In the present embodiment, the voltage applied to the primary chargers 21Y to 21K is generated by a charging high-voltage substrate 110 through the controller 101, and is a voltage obtained by superimposing an AC voltage that is a sine wave having a peak-to-peak voltage of 1200 [V] and a frequency of 2 [KHz] on a DC voltage of −500 [V]. As a result, the charging potential of the surfaces of the photosensitive drums 28Y, 28M, 28C, and 28K becomes-500 [V]. Note that the exposure potentials of the surfaces of the photosensitive drums 28Y, 28M, 28C, and 28K become −150 [V] by being exposed by the optical writing units 22Y, 22M, 22C, and 22K.

In addition, a DC voltage or a voltage obtained by superimposing an AC voltage on a DC voltage is applied to the first sleeve 33 and the second sleeve 34 of the developing units 1Y, 1M, 1C, and 1K, which are generated by a developing high-voltage substrate 120 through the controller 101. In the present embodiment, a voltage obtained by superimposing an AC voltage that is a rectangular wave having a duty ratio of 60%, a peak-to-peak voltage of 1400 [V], and a frequency of 12 [KHz] on a DC voltage of −350 [V] is applied to the first sleeve 33 and the second sleeve 34. The voltages applied to the collecting rollers 52 of the carrier collecting devices 5Y, 5M, 5C, and 5K will be described later.

In addition, the image forming apparatus 100 of the present embodiment includes a relative humidity detection unit 140 serving as a humidity detection unit capable of detecting the relative humidity around the image forming apparatus 100. The relative humidity detection unit 140 includes a humidity sensor, detects the relative humidity of the atmosphere around the image forming apparatus 100, and transmits the relative humidity detected by the humidity sensor to the controller 101.

The image processing unit 150 processes image information from an external device 170 such as a PC or a mobile terminal, and converts the image information into image forming information. The image forming units PY, PM, PC, and PK of the respective colors form toner images based on the image forming information. At this time, the image processing unit 150 calculates how much toner of each color is printed, and calculates a printing ratio (image ratio) for each image of each color. A soiling amount calculation unit 160 integrates the image ratio of the image formed, and predicts a soiling amount of the collecting roller 52. This point will also be described in detail later. The soiling amount of the collecting roller 52 may be determined by detecting a current between the developing roller and the photosensitive drum of the developing unit. That is, the toner charging amount may be calculated from the current, and the soiling amount of the collecting roller may be calculated based on the charging amount.

Carrier Collecting Device

Figure 6:
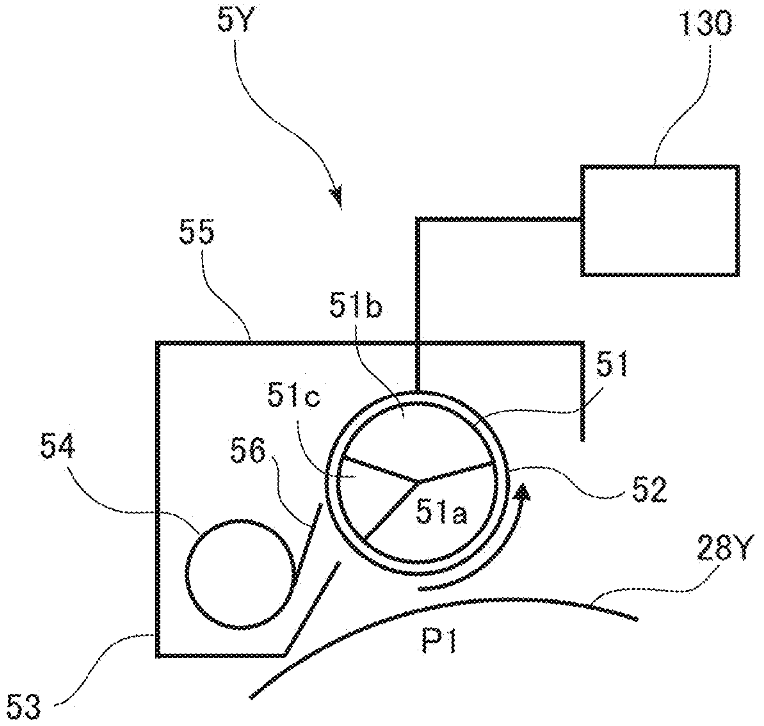
FIG. 6 is a schematic cross-sectional view of a configuration of a carrier collecting device according to the first embodiment.

Next, the carrier collecting devices 5Y, 5M, 5C, and 5K will be described with reference to FIGS. 3 and 6. Since the carrier collecting devices 5Y, 5M, 5C, and 5K have the same configuration, the carrier collecting device 5Y will be representatively described below. As described above, the carrier collecting device 5Y is disposed at a position facing the photosensitive drum 28Y downstream of the region (developing portion D) where the photosensitive drum 28Y approaches the developing unit 1Y and upstream of the region (primary transfer portion T1Y) where the photosensitive drum 28Y approaches the primary transfer roller 23Y with respect to the rotation direction of the photosensitive drum 28Y. As illustrated in FIG. 6, the carrier collecting device 5Y includes a collecting roller 52 serving as a rotatable sleeve disposed to face the photosensitive drum 28Y, a magnet roller 51 serving as a magnetic field generating unit (magnet) fixed inside the collecting roller 52, a collecting chamber 53, and a conveying screw 54 that conveys the carrier collected in the collecting chamber 53. These are disposed in a collecting container 55.

The magnet roller 51 has a plurality of (in the present embodiment, three) magnetic poles (magnet pieces) 51*a*, 51*b*, and 51*c*. The magnetic pole 51*a* is disposed at a position facing the photosensitive drum 28Y with the collecting roller 52 interposed therebetween. The magnetic pole 51*a* is a magnetic pole for attracting the carrier adhering to the outer peripheral surface of the photosensitive drum 28Y, and for this reason, the magnetic pole 51*a* is disposed in the vicinity of the closest position P1 between the photosensitive drum 28Y and the collecting roller 52. The magnetic pole 51*b* is disposed on the downstream side of the magnetic pole 51*a* in the rotation direction of the collecting roller 52, and has a polarity different from that of the magnetic pole 51*a*. The magnetic pole 51*c* is disposed adjacent to the magnetic pole 51*b* on the downstream side of the magnetic pole 51*b* in the rotation direction of the collecting roller 52, and has the same polarity as the magnetic pole 51*b*.

The collecting roller 52 is disposed downstream of a development position where the electrostatic latent image formed on the photosensitive drum 28Y is developed and upstream of a transfer position where the toner image borne on the photosensitive drum 28Y is transferred to the intermediate transfer belt 24 in the rotation direction of the photosensitive drum 28Y. The collecting roller 52 rotates in a direction indicated by an arrow in FIG. 6, and causes the carrier adhering to the photosensitive drum 28Y to be adsorbed to the surface of the collecting roller 52 by a magnetic field generated by a magnetic pole 51*a* disposed around a position close to the photosensitive drum 28Y. The adsorbed carrier is conveyed along with the rotation of the collecting roller 52, and is peeled off to the collecting chamber 53 by the repulsive magnetic field generated by the magnetic pole 51*b* and the magnetic pole 51*c*.

In the present embodiment, the carrier collecting blade 56 serving as a blade is disposed so as to face the collecting roller 52 via a gap downstream of the position where the collecting roller 52 faces the photosensitive drum 28Y in the rotation direction of the collecting roller 52. Then, the carrier collecting blade 56 removes the carrier adhering to the collecting roller 52. In the present embodiment, the carrier collecting blade 56 is disposed at a position facing the magnetic pole 51*c* across the collecting roller 52. Therefore, the carrier napped by the magnetic field of the magnetic pole 51*c* can be scraped off by the carrier collecting blade 56. As a result, the carrier remaining on the collecting roller 52 without falling from the collecting roller 52 due to the repulsive magnetic field by the magnetic pole 51*b* and the magnetic pole 51*c* can be scraped off into the collecting chamber 53 of the collecting container 55 by the carrier collecting blade 56.

The conveying screw 54 serving as a carrier conveying member has a rotation shaft made of a nonmagnetic metal and a blade made of a resin formed in a spiral shape around the rotation shaft. Then, the conveying screw 54 rotates to convey the carrier dropped from the collecting roller 52 in the rotational axis direction. In the present embodiment, the rotational axis direction of the conveying screw 54 and the rotational axis direction of the collecting roller 52 are substantially parallel to each other.

A bias including an AC voltage, in the present embodiment, a voltage obtained by superimposing an AC voltage on a DC voltage is applied to the collecting roller 52 from a collecting high-voltage substrate 130 serving as a voltage application unit (bias application unit). As illustrated in FIG. 5, the collecting high-voltage substrate 130 is controlled by the controller 101, and can apply an AC voltage superimposed on a DC voltage according to the operation of the carrier collecting device 5Y.

During Normal Image Forming

The voltage (first bias) applied from the collecting high-voltage substrate 130 to the collecting roller 52 during normal image forming (in first mode or during image forming operation) will be described. The DC component of the voltage applied to the collecting roller 52 during normal image forming is a voltage having a difference of 100 [V] with respect to the charging potential of the photosensitive drum 28Y. This is to prevent the negative toner developing the electrostatic latent image on the photosensitive drum 28Y from moving to the collecting roller 52. That is, in the present embodiment, the DC voltage applied to the collecting roller 52 in the first mode is a voltage having the same polarity (in the present embodiment, negative polarity) as the normal charging polarity of the toner. In other words, during normal image forming, the polarity of the DC potential of the photosensitive drum 28Y and the polarity of the DC potential of the collecting roller 52 are the same as the charging polarity of the toner, and the absolute value of the DC potential of the collecting roller 52 is larger than the absolute value of the DC potential of the photosensitive drum 28Y. As described above, since the charging potential is −500 [V], the DC voltage applied to the collecting roller 52 in the first mode is −600 [V].

In the first mode, the AC voltage is applied to the collecting roller 52 in a manner of being superimposed on the DC voltage in order to improve the collectability of the carrier adhering to the photosensitive drum 28Y. In the present embodiment, the AC component of the voltage applied to the collecting roller 52 during normal image forming is a rectangular wave having a duty ratio of 50%, a peak-to-peak voltage of 1500 [V], and a frequency of 5 [KHz]. The carrier collecting device 5Y collects the carrier adhering to the photosensitive drum 28Y by the force of the magnetic field generated by the magnet roller 51 and the force of the electric field generated between the collecting roller 52 and the photosensitive drum 28Y by the voltage applied to the collecting roller 52.

Toner Adhesion on Collecting Roller

Next, toner adhesion to the collecting roller 52 will be described. As described above, a voltage is applied to the collecting roller 52 to facilitate collection of the carrier on the surface of the photosensitive drum 28Y at the closest position P1 between the photosensitive drum 28Y and the collecting roller 52. At this time, the so-called fogging toner adhering to the surface of the photosensitive drum 28Y is also collected by the collecting roller 52. That is, the toner adheres to the collecting roller 52.

Figure 7:
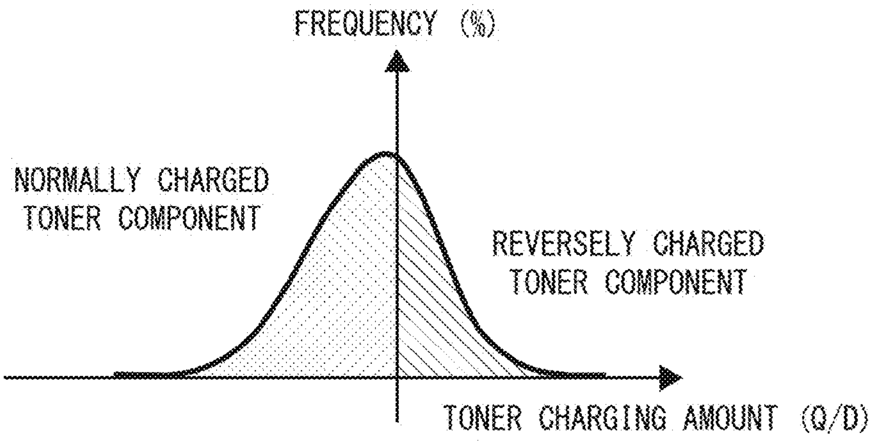
FIG. 7 is a graph illustrating a distribution of the charge amount of toner adhering to a collecting roller.

FIG. 7 is a diagram illustrating a distribution of the charge amount of the toner adhering to the collecting roller 52. The toner inside the developing unit 1Y is negatively charged, but, as illustrated in FIG. 7, the toner adhering to the collecting roller 52 is mostly weakly charged toner with no charge centered around 0 charge (that is, toner having a charge amount of 0 or close to 0) or a reversely charged toner (that is, positively charged toner). Such a toner adheres to the background portion of the image and becomes fogging toner. Toner in a normal charged state adheres to the photosensitive drum 28Y by electrostatic force, but weakly charged toner and reversely charged toner have weak adhesion force to the photosensitive drum 28Y by electrostatic force. Therefore, at the closest position P1 between the collecting roller 52 and the photosensitive drum 28Y, weakly charged toner and reversely charged toner easily transfer to the collecting roller 52.

Since the toner is a non-magnetic material, the toner transferred to the collecting roller 52 is not affected by the magnetic force generated by the magnetic pole of the magnet roller 51 and moves with the collecting roller 52 while being fixed to the surface of the collecting roller 52. However, when the toner reaches the magnetic pole 51*b* and the magnetic pole 51*c* which are the peeling pole portion, the toner is rubbed by the carrier staying in the peeling pole portion, is deposited together with the carrier, and is finally collected in the collecting chamber 53.

However, if the amount of the carrier on the collecting roller 52 is not sufficient, the carrier staying in the peeling electrode portion is insufficient, and the toner cannot be sufficiently collected in the peeling pole portion. In this case, the toner is deposited on the collecting roller 52. Then, when the gap between the photosensitive drum 28Y and the collecting roller 52 is filled with the toner on the collecting roller 52, the toner on the collecting roller 52 adheres to the photosensitive drum 28Y again (so-called dripping occurs), and as a result, the toner is transferred to an output product to generate image noise. Therefore, in the present embodiment, the toner adhering to the collecting roller 52 is electrically returned to the surface of the photosensitive drum 28Y, and the toner of the collecting roller 52 is removed.

Operation of Removing Toner on Collecting Roller

In the present embodiment, in order to improve the toner removal efficiency of the collecting roller 52, the toner removal mode serving as the second mode (predetermined mode) can be executed separately from the normal image forming (first mode). In the toner removal mode, the toner on the collecting roller 52 is removed by moving the toner from the collecting roller 52 to the photosensitive drum 28Y by an electric field.

At this time, as illustrated in FIG. 7, the distribution of the charge amount of the toner on the collecting roller 52 is different from the toner in the developing unit 1Y during the normal image forming, and the ratio of not only the normally charged toner but also the reversely charged toner is high. Therefore, only by applying-600 [V] to the collecting roller 52 with respect to the photosensitive drum 28Y charged to −500 [V] as in the developing unit 1Y, only the normally charged toner is removed, and the reversely charged toner remains on the collecting roller 52, so that the removal is not sufficiently performed.

Figure 8:
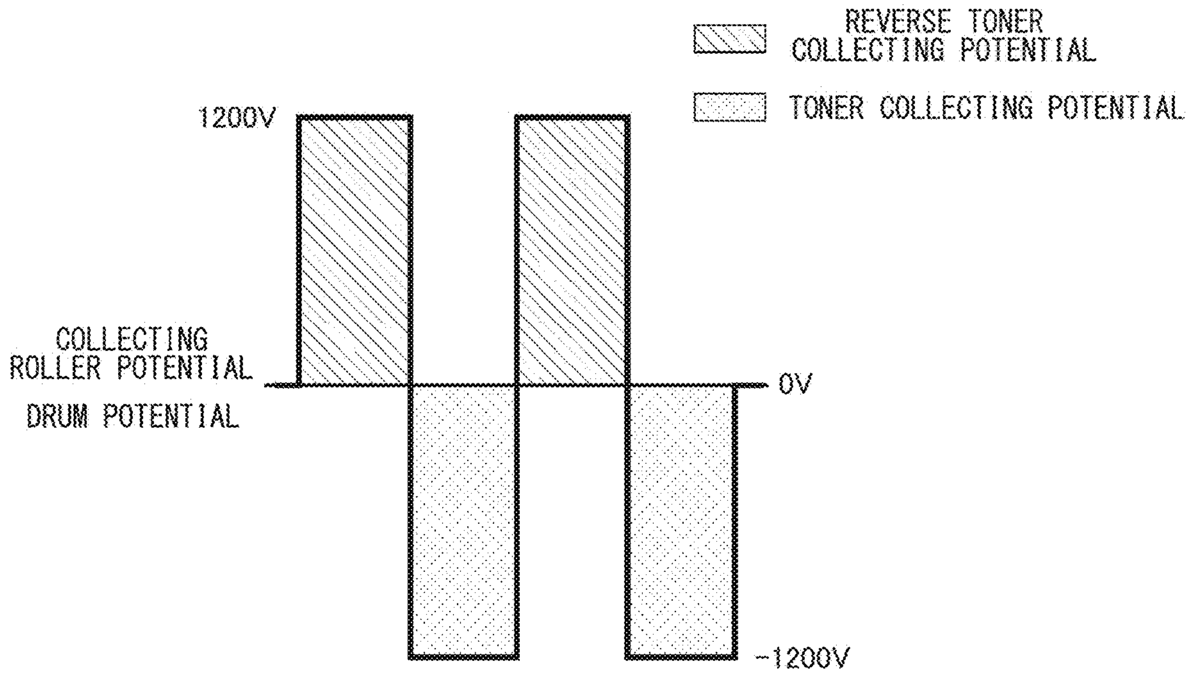
FIG. 8 is a diagram showing a voltage pattern in a toner removal mode in a comparative example.

Therefore, in the prior art described in US2020/0292967, as illustrated in FIG. 8 shown as a comparative example, by setting the potential difference (DC bias difference) between the photosensitive drum and the collecting roller to 0 and applying only the AC voltage (AC bias), the toner is vibrated to be transferred onto the photosensitive drum and removed. In the comparative example of FIG. 8, an AC voltage with a duty ratio of 50% and a peak-to-peak voltage of 2400 [V] is illustrated. However, since this alone is insufficient in terms of the toner removal efficiency, the removal efficiency is compensated by decreasing the peripheral speed of the photosensitive drum. For this reason, in the comparative example, a large amount of downtime such as speed switching of the photosensitive drum is required, which causes a decrease in productivity.

Toner Removal Mode of Present Embodiment

Therefore, in the toner removal mode (second mode) of the present embodiment, the transfer efficiency of the toner from the collecting roller 52 to the photosensitive drum 28Y is increased as compared with the comparative example, and the toner is transferred onto the photosensitive drum 28Y only by the bias (in the present embodiment, the second bias and the third bias) without decreasing the peripheral speed of the photosensitive drum 28Y. That is, in the toner removal mode (second mode) of the present embodiment, while the photosensitive drum 28Y is rotated at the same speed as in the first mode, in the AC voltage in which a voltage having a reverse polarity to the normal charging polarity of the toner and a voltage having a same polarity as the normal charging polarity of the toner are set as one cycle, the first voltage pattern (third bias) in which the duty ratio, which is the ratio of the duration of the voltage having the reverse polarity to the normal charging polarity of the toner, is larger than 50% (that is, the duty ratio is higher than the duty ratio during normal image forming (first mode)) and the second voltage pattern (second bias) in which the duty ratio is smaller than 50% (that is, the duty ratio is lower than the duty ratio during normal image forming (first mode)) are switched at a constant period and applied to the collecting roller 52. In the AC voltage in which the voltage having the reverse polarity to the normal charging polarity of the toner and the voltage having the same polarity as the normal charging polarity of the toner are set as one cycle (one period), the duration of the voltage of the reverse polarity to the normal charging polarity of the toner is t1, and the duration of the voltage of the same polarity as the normal charging polarity of the toner is t2 (see FIG. 9). At this time, in the AC voltage in which the voltage having the reverse polarity to the normal charging polarity of the toner and the voltage having the same polarity as the normal charging polarity of the toner are set as one cycle, the duty ratio, which is the ratio of the duration of the voltage having the reverse polarity to the normal charging polarity of the toner, is represented by "t1/(t1+t2)".

Figure 9:
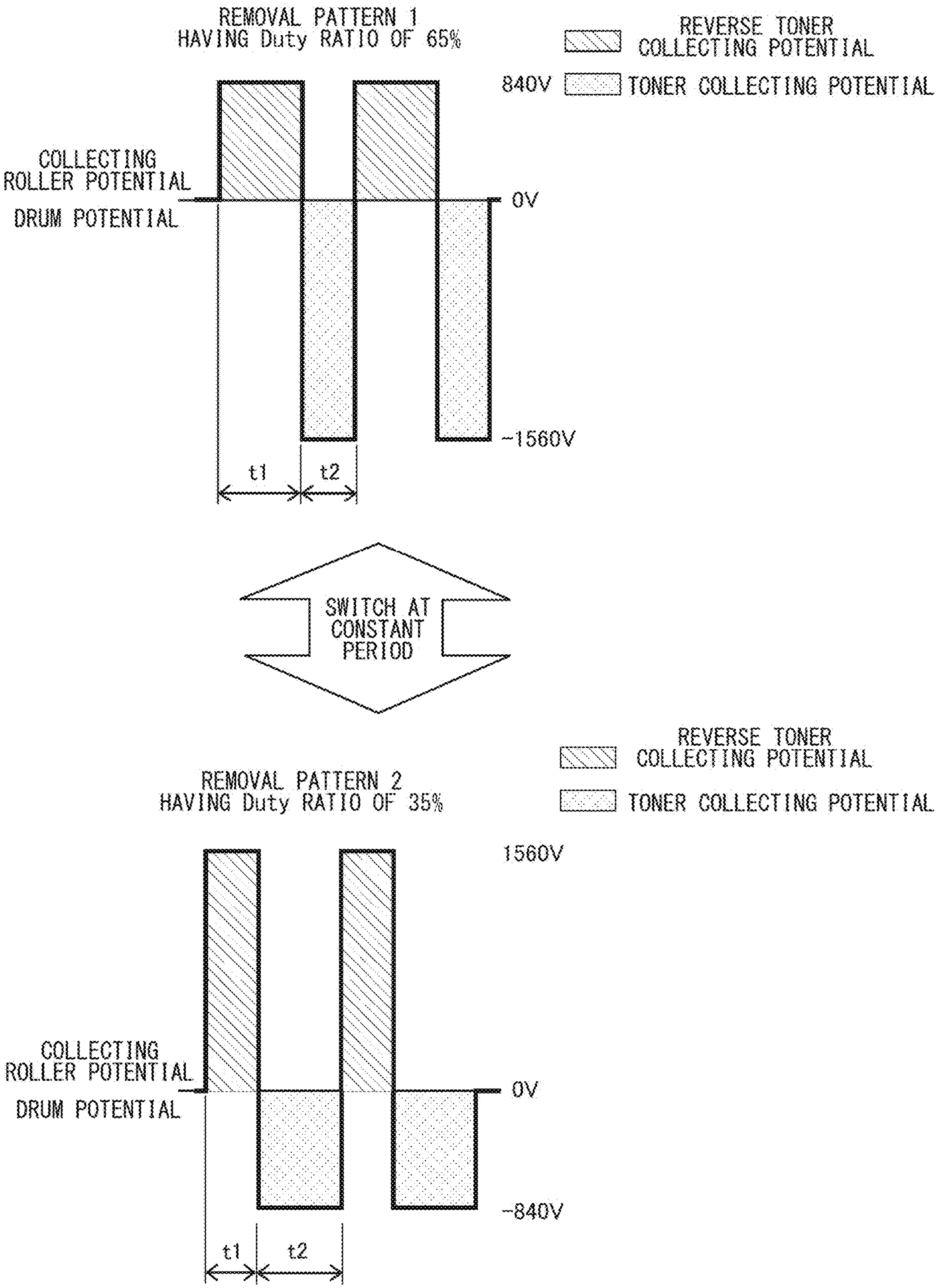
FIG. 9 is a schematic view illustrating a first voltage pattern and a second voltage pattern in a toner removal mode according to the first embodiment.

FIG. 9 illustrates bias patterns (a first voltage pattern and a second voltage pattern) in the toner removal mode in the present embodiment. The bias pattern is constituted of an AC voltage (AC bias), and is constituted of two biases of a removal pattern 1 (first voltage pattern) having a duty ratio of 65% and a removal pattern 2 (second voltage pattern) having a duty ratio of 35% or less. FIG. 9 schematically illustrates a state in which these two patterns are switched at a constant period.

The removal pattern 1 (third bias) may be a pattern having a duty ratio larger than 50% (that is, a pattern having a duty ratio higher than the duty ratio during normal image forming (first mode)), and the removal pattern 2 (second bias) may be a pattern having a duty ratio smaller than 50% (that is, a pattern having a duty ratio lower than the duty ratio during normal image forming (first mode)). In the toner removal mode, a combination of the removal pattern 1 and the removal pattern 2 may be used. In the present embodiment, the duty ratio of the removal pattern 1 is 65%, and the duty ratio of the removal pattern 2 is 35%. Each of the AC voltages in the removal pattern 1 and the removal pattern 2 was a rectangular wave having a peak-to-peak voltage of 2400 [V] and a frequency of 5 [KHz].

Also in the present embodiment, similarly to Comparative Example 1, the difference in surface potential between the photosensitive drum 28Y and the collecting roller 52 is set to 0 V. That is, in the toner removal mode, the controller 101 controls the collecting high-voltage substrate 130 so that the difference in surface potential between the photosensitive drum 28Y and the collecting roller 52 becomes 0 V, and then switches the removal pattern 1 and the removal pattern 2 at a constant period to apply the same to the collecting roller 52. That is, in the toner removal mode, the absolute value of the DC potential of the collecting roller 52 is set to be the same as the absolute value of the DC potential of the photosensitive drum 28Y. As a method of controlling the surface potential of the photosensitive drum 28Y to 0 V, for example, it is conceivable to stop the charging operation in the primary charger 21Y that operates during normal image forming, and expose the surface of the photosensitive drum 28Y with the laser of the optical writing unit 22Y to neutralize the surface of the photosensitive drum 28Y to set the surface potential to 0 V. The DC bias component of the collecting roller 52 is 0 V (earth). In the present embodiment, the potential difference between the photosensitive drum 28Y and the collecting roller 52 is 0 V. If the potential difference between the photosensitive drum 28Y and the collecting roller 52 is 0 V, for example, the photosensitive drum 28Y is set to −500 V and the collecting roller 52 is set to −500 V, the same effect can be obtained even if the potential value of the photosensitive drum 28Y is not 0 V.

Figure 10A:
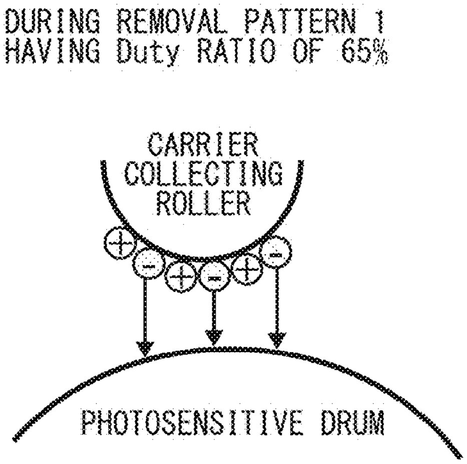
FIG. 10A is a view for explaining a toner that moves when a first voltage pattern is applied in the first embodiment.

In FIG. 9, in the removal pattern 1 having the duty ratio of 65%, the peak value of the voltage (the negative voltage in the present embodiment, −1560 V in FIG. 9) having the same polarity as the normal charging polarity of the toner becomes high because the duration of the voltage (the positive voltage in the present embodiment, 840 V in FIG. 9) having the reverse polarity to the normal charging polarity of the toner is long. The graph of FIG. 9 illustrates a temporal change of the AC voltage, but even when the duty ratio is changed, the area indicating the voltage on the positive side and the area of the voltage on the negative side are the same. Therefore, when the duration of the positive voltage is long, the peak value of the negative voltage becomes high. Therefore, in the removal pattern 1, an AC voltage having a high negative voltage peak value is applied between the collecting roller 52 and the photosensitive drum 28Y. Therefore, as illustrated in FIG. 10A, in the removal pattern 1 having the duty ratio of 65%, the force for moving the toner having the same normal charging polarity (negative polarity in the present embodiment) as the toner in the developing unit 1Y to the photosensitive drum 28Y is strong, and the removal efficiency of the normally charged toner is very high. On the other hand, when only the removal pattern 1 is used, the removal efficiency of the reversely charged toner decreases, and the removal efficiency decreases.

Figure 10B:
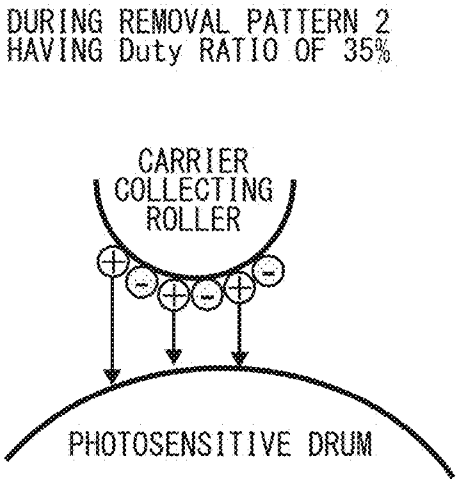
FIG. 10B is a view for explaining a toner that moves when a second voltage pattern is applied in the first embodiment.

In FIG. 9, in the removal pattern 2 having the duty ratio of 35%, the peak value of the voltage (the negative voltage in the present embodiment, −840 V in FIG. 9) having the same polarity as the normal charging polarity of the toner becomes low because the duration of the voltage (the positive voltage in the present embodiment, 1560 V in FIG. 9) having the reverse polarity to the normal charging polarity of the toner is short. In other words, the peak value of the voltage of the reverse polarity to the normal charging polarity of the toner (the voltage on the positive side in the present embodiment) becomes high. Therefore, in the removal pattern 2, an AC voltage having a high positive voltage peak value is applied between the collecting roller 52 and the photosensitive drum 28Y. Therefore, as illustrated in FIG. 10B, in the removal pattern 2 having the duty ratio of 35%, the force for moving the toner (reversely charged toner, positively charged toner) having the reversely charged polarity to the polarity of the normally charged toner to the photosensitive drum 28Y is strong, and the removal efficiency of the reversely charged toner becomes high. On the other hand, the removal efficiency of the normally charged toner decreases when only the removal pattern 2 is used.

Therefore, in the present embodiment, the bias patterns of the removal pattern 1 and the removal pattern 2 are alternately applied to the collecting roller 52. As a result, not only the normally charged toner but also the reversely charged toner can be moved to the photosensitive drum 28Y. As described above, since both the normally charged toner and the reversely charged toner on the collecting roller 52 can be moved to the photosensitive drum 28Y, the toner on the collecting roller 52 can be efficiently removed. As a result, the toner on the collecting roller 52 can be efficiently removed without reducing the rotational speed of the photosensitive drum 28Y as in the comparative example, and the downtime is not increased. In the present embodiment in which the rotational speed of the photosensitive drum 28Y is not reduced when the bias patterns of the removal pattern 1 and the removal pattern 2 are alternately applied to the collecting roller 52, it has been confirmed that the same effect can be obtained as the toner removal efficiency of the collecting roller 52. On the other hand, when the bias patterns of the removal pattern 1 and the removal pattern 2 are alternately applied to the collecting roller 52, even in a case where the rotational speed of the photosensitive drum 28Y is reduced, the toner removal efficiency of the collecting roller 52 increases. When the bias patterns of the removal pattern 1 and the removal pattern 2 are alternately applied to the collecting roller 52, in a case where the rotational speed of the photosensitive drum 28Y is not reduced, the time required for the control can be decreased (for example, decreased from 60 seconds to 30 seconds) as compared with a case where the rotational speed of the photosensitive drum 28Y is reduced.

From the viewpoint of enhancing the toner removal efficiency of the collecting roller 52, the time for applying the removal pattern 1 and the removal pattern 2 is preferably equal to or longer than the time required for one rotation of the collecting roller 52. The duty ratio in the removal pattern 1 is preferably 60% or more. Furthermore, the duty ratio in the removal pattern 2 is preferably 40% or less. In the present embodiment, in order to more efficiently remove the toner from the collecting roller 52, the change timing for switching between the removal pattern 1 and the removal pattern 2 is two times the rotation period of the collecting roller 52. In the present embodiment, the application time of the removal pattern 1 having a duty ratio of 65% and the application time of the removal pattern 2 having a duty ratio of 35% are equal to each other.

As described above, in the present embodiment, an example in which the bias patterns of the removal pattern 1 and the removal pattern 2 are alternately applied to the collecting roller 52 in the toner removal mode has been described. That is, in the present embodiment, in order to move not only the reversely charged toner but also the normally charged toner to the photosensitive drum 28Y in the toner removal mode, not only the bias pattern of the removal pattern 2 but also the bias pattern of the removal pattern 1 is applied to the collecting roller 52.

On the other hand, as illustrated in FIG. 7, most of the toner adhering to the collecting roller 52 is weakly charged toner or reversely charged toner. Therefore, if the reversely charged toner can be moved to the photosensitive drum 28Y in the toner removal mode, a sufficient effect as the toner removal efficiency of the collecting roller 52 can be obtained. Therefore, in the toner removal mode, instead of alternately applying the bias patterns of the removal pattern 1 and the removal pattern 2 to the collecting roller 52, only the bias pattern of the removal pattern 2 may be applied to the collecting roller 52 as a variation.

Sequence Until Entering Toner Removal Mode

Figure 11:
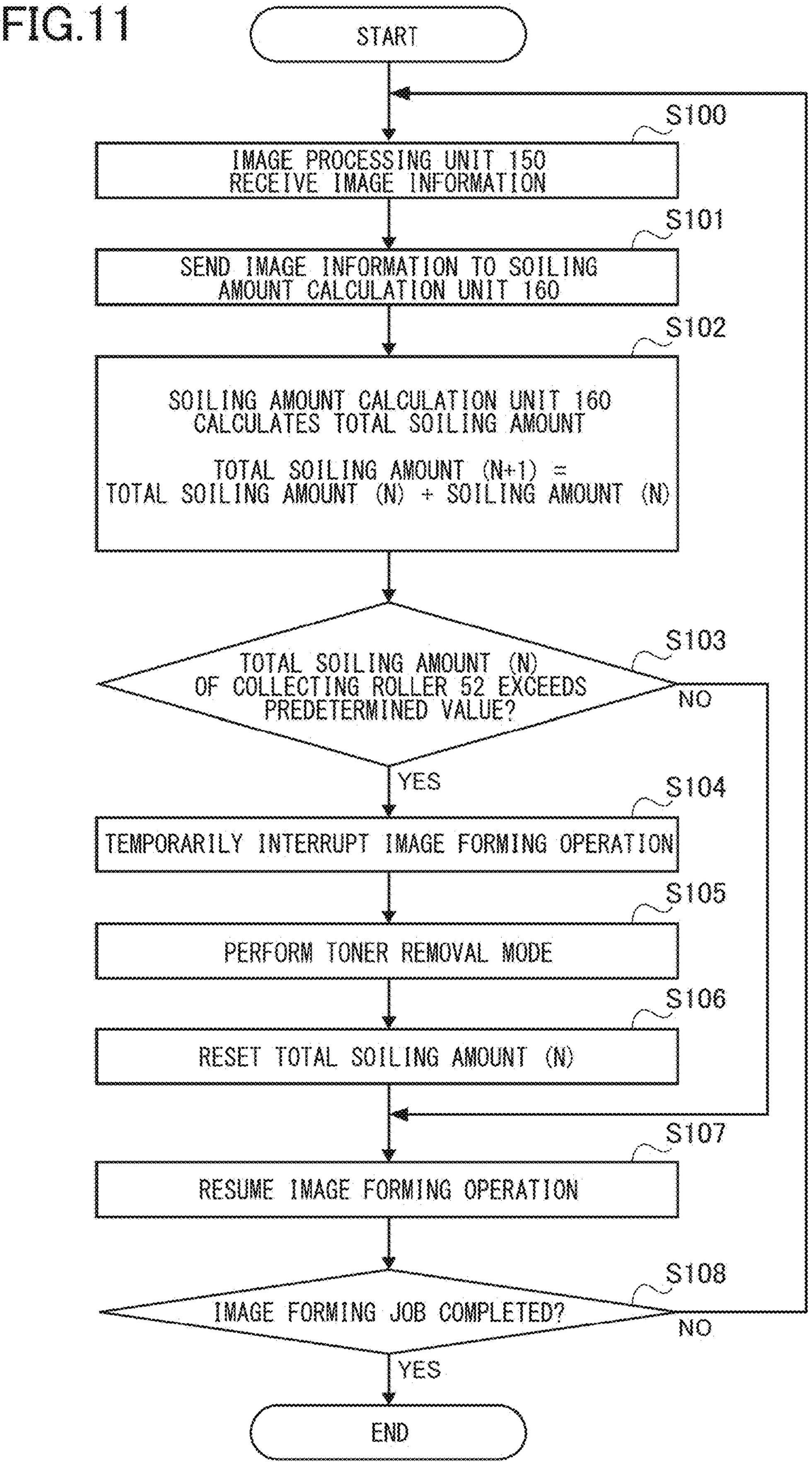
FIG. 11 is a flowchart during image forming and a toner removal mode according to the first embodiment.

Next, the operation until entering the toner removal mode of the present embodiment will be described with reference to FIGS. 5 and 11. First, when the image processing unit 150 receives image information from the external device 170 (S100), the image processing unit 150 sends the image information to the soiling amount calculation unit 160 (S101). The controller 101 causes the soiling amount calculation unit 160 to integrate the image ratio (printing ratio) of the image formed according to the image information, and calculates the current soiling amount (total soiling amount) of the collecting roller 52 from the integrated value (S102).

It is assumed that the soiling amount is proportional to the image ratio, and is calculated as the soiling amount (N)=image ratio×$\alpha$. Note that $\alpha$ is a constant and is a fixed value of 1 in the present embodiment, but may be a variable such as varying depending on humidity. Therefore, the total soiling amount is an integrated value of the image ratio (%). The total soiling amount (N) calculated by the soiling amount calculation unit 160 is sent to the controller 101, the controller 101 determines whether the soiling amount is higher than a predetermined value (S103). In the present embodiment, the predetermined value is 10,000.

When the total soiling amount (N) is equal to or less than the predetermined value (NO in S103), the image forming operation is continued without performing the toner removal mode, and the process proceeds to S107 described later. On the other hand, when the total soiling amount (N) exceeds the predetermined value (YES in S103), the image forming operation is temporarily interrupted (S104), and the toner removal mode is performed (S105). The content of the toner removal mode will be described later. After the toner removal mode ends, the total soiling amount (N) is reset (S106), and the image forming operation is resumed (S107). The above operation is continuously performed until the image forming job ends (S108).

Note that the image forming job is a period from the start of the image forming operation to the completion of the image forming operation based on an image forming signal for forming an image on a recording material. Specifically, it refers to a period from pre-rotation (preparation operation before image forming) to post-rotation (operation after image forming) after receiving an image forming signal (input of an image forming job), and is a period including a period of the image forming operation and a period of non-image forming such as sheet interval.

Sequence of Toner Removal Mode of Present Embodiment

Figure 12:
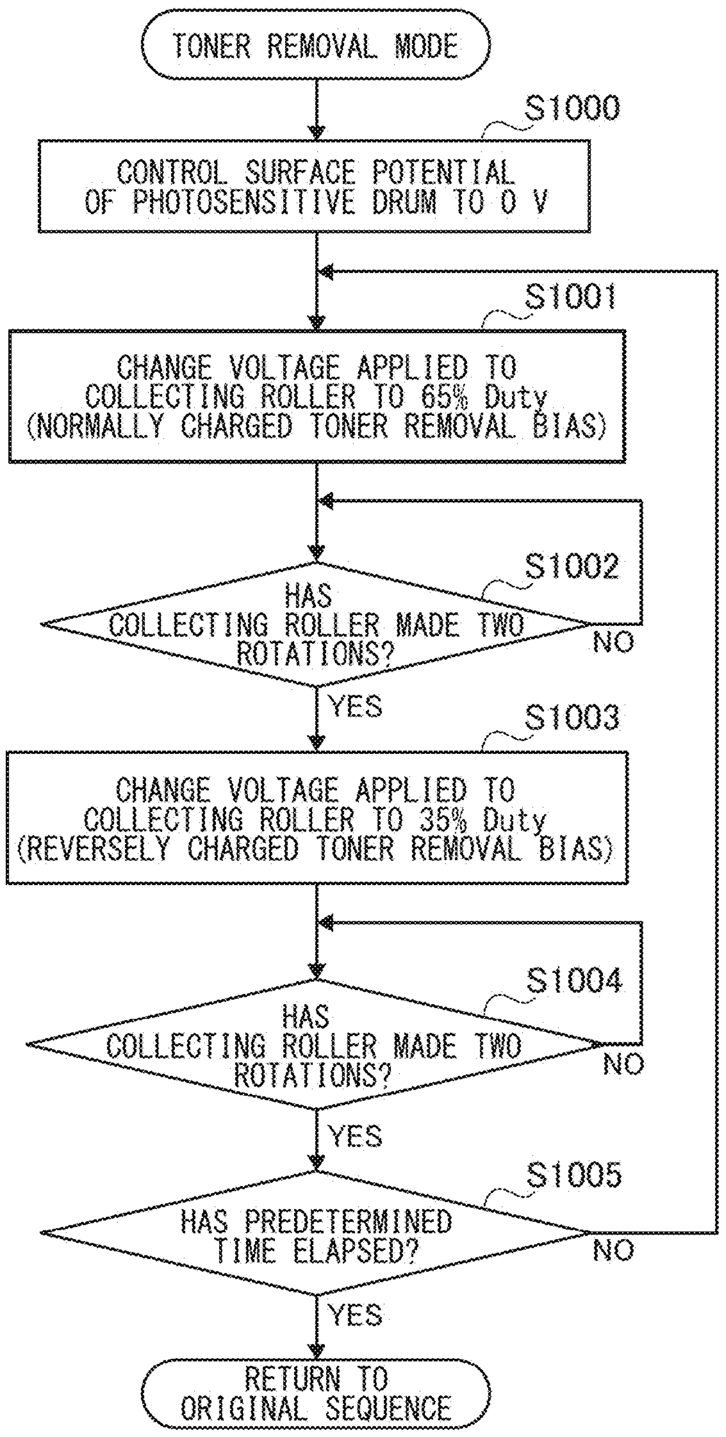
FIG. 12 is a flowchart during a toner removal mode according to the first embodiment.

Next, a sequence of the toner removal mode in the present embodiment will be described with reference to FIG. 12. In S105 of FIG. 11, when the toner removal mode starts, first, the surface potential of the photosensitive drum 28Y is controlled to 0 V (S1000). As a method of controlling the surface potential of the photosensitive drum 28Y to 0 V, for example, it is conceivable to stop the charging operation in the primary charger 21Y that operates during normal image forming, and expose the surface of the photosensitive drum 28Y with the laser of the optical writing unit 22Y to neutralize the surface of the photosensitive drum 28Y to set the surface potential to 0 V. Next, the controller 101 changes the voltage applied to the collecting roller 52 to the AC bias (removal pattern 1) having the duty ratio of 65% using the collecting high-voltage substrate 130 (S1001). Accordingly, the normally charged toner adhering to the collecting roller 52 is removed.

After applying the bias of the removal pattern 1 for the time corresponding to two rotations of the collecting roller 52 (YES in S1002), the controller 101 changes the voltage applied to the collecting roller 52 to the AC bias (removal pattern 2) having the duty ratio of 35% using the collecting high-voltage substrate 130 (S1003). As a result, the reversely charged toner adhering to the collecting roller 52 is removed.

After the bias of the removal pattern 2 is applied for the time corresponding to two rotations of the collecting roller 52 (YES in S1004), the sequence from S1001 to S1004 is continued until a predetermined time elapses (S1005). The predetermined time here is a time set in advance as an execution time of the toner removal mode. The predetermined time is, for example, 60 seconds.

Sequence of Toner Removal Mode in Comparative Example

Figure 13:
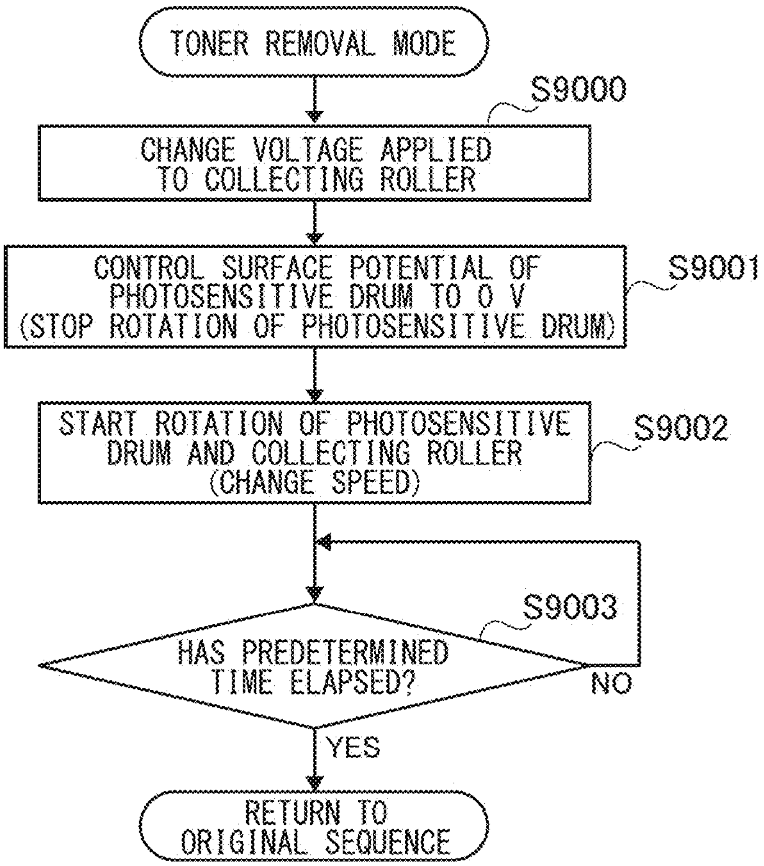
FIG. 13 is a flowchart during a toner removal mode according to a comparative example.

Next, a sequence of the toner removal mode in the comparative example will be described with reference to FIG. 13. In step S105 in FIG. 11, in the toner removal mode, the controller 101 first changes the voltage applied to the collecting roller 52 to the AC bias (the duty ratio of 50%) using the collecting high-voltage substrate 130 (S9000). Then, the surface potential of the photosensitive drum 28Y is controlled to 0 V (S9001). At this time, the photosensitive drum 28Y is stopped. Next, the rotation of the photosensitive drum 28Y and the collecting roller 52 is started with a peripheral speed ratio different from that during normal image forming (S9002). Specifically, the peripheral speed of the photosensitive drum 28Y is made slower than that during image forming so as to generate the peripheral speed difference between the photosensitive drum 28Y and the collecting roller 52. The sequence is continued until a predetermined time elapses (S9003).

As described above, in the comparative example, in the sequence of the toner removal mode, the photosensitive drum 28Y and the collecting roller 52 are once stopped in order to change the speed, and the driving is restarted, so that much downtime occurs. On the other hand, in the sequence of the toner removal mode in the present embodiment, the photosensitive drum 28Y and the collecting roller 52 are not stopped, and only the bias is applied, so that the downtime is small, and the toner can be efficiently removed.

Experiment 1

In order to confirm the effect of the present embodiment, the following experiment was performed. In the experiment, using the image forming apparatus of the present embodiment described above, image forming was actually performed in Comparative Example 1 in which the toner removal mode was not executed, Comparative Example 2 in which the sequence of the toner removal mode described above with reference to FIGS. 8 and 13 was executed, and Example 1 in which the sequence of the toner removal mode of the present embodiment was executed, and soiling of the collecting roller 52 was examined. Downtime was also compared at the same time. The results are shown in Table 1. Note that "dripping" shown in Table 1 means that the toner on the collecting roller 52 adheres to the photosensitive drum 28Y again, and the soiling of the collecting roller 52 was determined by whether or not dripping occurred.

TABLE 1

| | Toner removal mode | Soiling of toner on collecting roller | Downtime |
|---|---|---|---|
| Comparative example 1 | None | Dripping | None |
| Comparative example 2 | AC + generating a peripheral speed difference | No dripping | Large |
| Example 1 | Switching duty ratio of AC | No dripping | Small |

As is apparent from Table 1, although there was no downtime in Comparative Example 1, dripping occurred. On the other hand, in Comparative Example 2, dripping did not occur, but the downtime significantly increased. On the other hand, in Example 1, it was possible to prevent dripping as in Comparative Example 2 while suppressing downtime. That is, in Example 1, the toner removal efficiency can be greatly improved as compared with Comparative Example 1, and the same toner removal efficiency can be achieved while the downtime is reduced as compared with Comparative Example 2.

Second Embodiment

A second embodiment will be described with reference to FIGS. 14 and 15. In the present embodiment, unlike the first embodiment, the DC voltage (DC component) is offset instead of changing the duty ratio as the voltage pattern applied to the collecting roller 52 in the toner removal mode. Other configurations and operations are the same as those of the first embodiment described above.

In the toner removal mode (second mode) of the present embodiment, while the photosensitive drum 28Y is rotated at the same speed as in the first mode, the first voltage pattern obtained by superimposing an AC voltage on a DC voltage in which the polarity of the potential of the collecting roller 52 with respect to the photosensitive drum 28Y is negative and the second voltage pattern obtained by superimposing an AC voltage on a DC voltage in which the polarity of the potential of the collecting roller 52 with respect to the photosensitive drum 28Y is positive are switched at a constant period and applied to the collecting roller 52.

Figure 14:
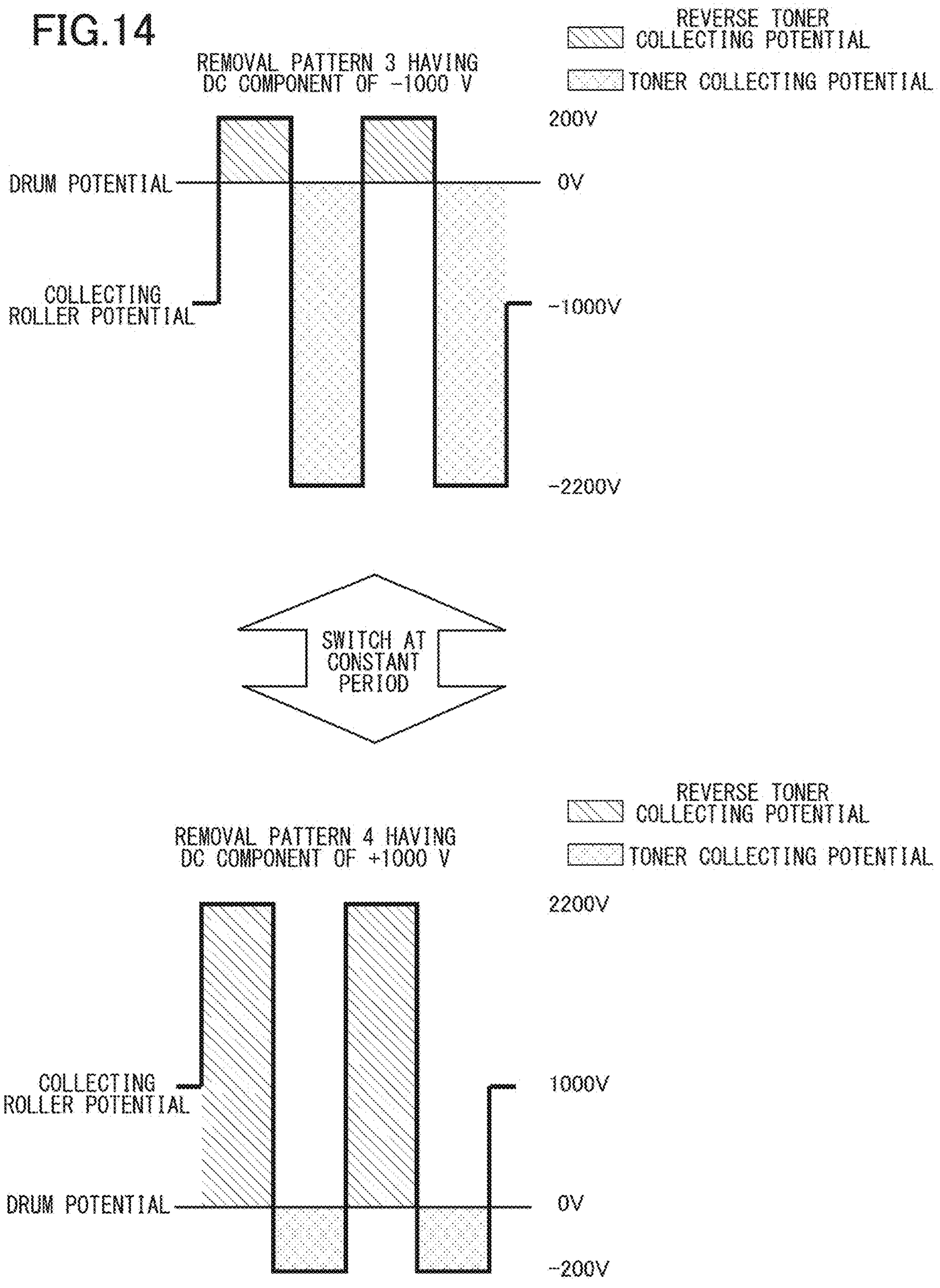
FIG. 14 is a schematic diagram illustrating a first voltage pattern and a second voltage pattern in a toner removal mode according to a second embodiment.
Figure 15:
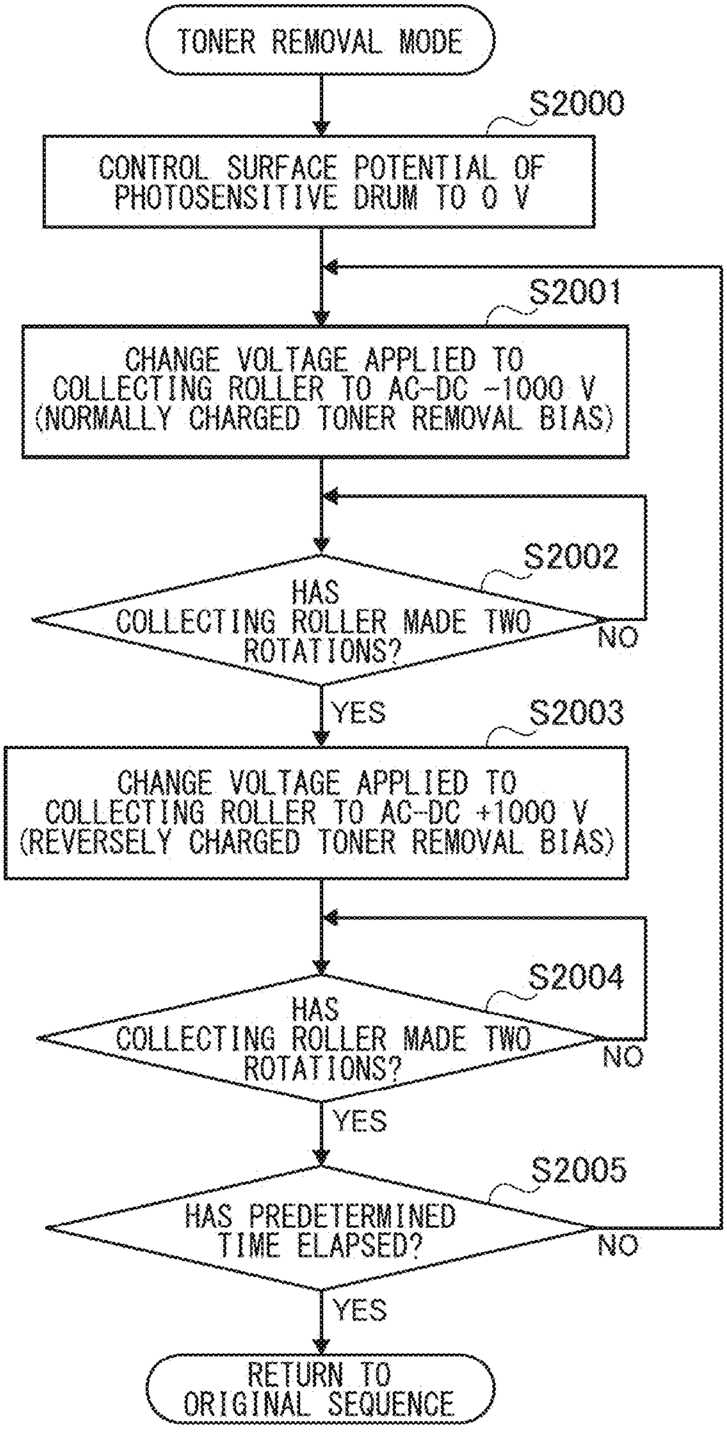
FIG. 15 is a flowchart during image forming and a toner removal mode according to the second embodiment.

FIG. 14 illustrates bias patterns (a first voltage pattern and a second voltage pattern) in the toner removal mode in the present embodiment. The bias pattern is constituted of an AC voltage (AC bias) and a DC voltage (DC bias), and is constituted of two biases of a removal pattern 3 (first voltage pattern) having a DC component of −1000 V and a removal pattern 4 (second voltage pattern) having a DC component of +1000 V. FIG. 14 schematically illustrates a state in which these two patterns are switched at a constant period.

In the toner removal mode of the present embodiment, each of the duty ratios of the AC voltage (AC component) in the removal pattern 3 and the removal pattern 4 is 50%. The absolute value of the DC voltage in the removal pattern 3 and the absolute value of the DC voltage in the removal pattern 4 are the same. That is, in both cases, the absolute value is set to 1000 V. However, the magnitude of the DC voltage may be changed between the removal pattern 3 and the removal pattern 4. Similarly to the first embodiment, the time for applying the removal pattern 3 and the removal pattern 4 is preferably equal to or longer than the time required for the collecting roller to make one rotation, and the change timing for switching between the removal pattern 1 and the removal pattern 2 is two times the rotation period of the collecting roller 52. Furthermore, the application times of the removal pattern 3 and the removal pattern 4 were set to be the same. The sequence until entering the toner removal mode of the present embodiment is similar to that of the first embodiment described with reference to FIG. 11.

Sequence of Toner Removal Mode of Present Embodiment

Next, a sequence of the toner removal mode in the present embodiment will be described with reference to FIG. 15. In S105 of FIG. 11, when the toner removal mode starts, first, the surface potential of the photosensitive drum 28Y is controlled to 0 V (S2000). Next, the controller 101 changes the voltage applied to the collecting roller 52 to the AC bias having the duty ratio of 50% and the DC bias of −1000 V (removal pattern 3) (S2001) using the collecting high-voltage substrate 130. Accordingly, the normally charged toner adhering to the collecting roller 52 is removed.

After applying the bias of the removal pattern 3 for the time corresponding to two rotations of the collecting roller 52 (YES in S2002), the controller 101 changes the voltage applied to the collecting roller 52 to the AC bias having the duty ratio of 50% and the DC bias of +1000 V (removal pattern 4) using the collecting high-voltage substrate 130 (S2003). As a result, the reversely charged toner adhering to the collecting roller 52 is removed.

After the bias of the removal pattern 4 is applied for the time corresponding to two rotations of the collecting roller 52 (YES in S2004), the sequence from S2001 to S2004 is continued until a predetermined time elapses (S2005). The predetermined time here is a time set in advance as an execution time of the toner removal mode. The predetermined time is, for example, 60 seconds. In the present embodiment in which the rotational speed of the photosensitive drum 28Y is not reduced when the bias patterns of the removal pattern 3 and the removal pattern 4 are alternately applied to the collecting roller 52, it has been confirmed that the same effect can be obtained as the toner removal efficiency of the collecting roller 52. On the other hand, when the bias patterns of the removal pattern 3 and the removal pattern 4 are alternately applied to the collecting roller 52, even in a case where the rotational speed of the photosensitive drum 28Y is reduced, the toner removal efficiency of the collecting roller 52 is increased. When the bias patterns of the removal pattern 3 and the removal pattern 4 are alternately applied to the collecting roller 52, in a case where the rotational speed of the photosensitive drum 28Y is not reduced, the time required for the control can be decreased (for example, decreased from 60 seconds to 30 seconds) as compared with a case where the rotational speed of the photosensitive drum 28Y is reduced.

Experiment 2

In order to confirm the effect of the present embodiment, an experiment similar to Experiment 1 described in the first embodiment was performed. Comparative Examples 1 and 2 and Example 1 are the same as Experiment 1. In Experiment 2, Example 2 in which the sequence of the toner removal mode of the present embodiment was performed was also examined. The results are shown in Table 2.

TABLE 2

| | Toner removal mode | Soiling of toner on collecting roller | Downtime |
|---|---|---|---|
| Comparative example 1 | None | Dripping | None |
| Comparative example 2 | AC + generating a peripheral speed difference | No dripping | Large |
| Example 1 | Switching duty ratio of AC | No dripping | Small |
| Example 2 | Switching of DC | No dripping | Small |

As is apparent from Table 2, in Example 2, the occurrence of dripping could be prevented as in Comparative Example 2 while the downtime was suppressed as in Example 1.

Third Embodiment

A third embodiment will be described with reference to FIGS. 16A to 18. In the present embodiment, as in the first embodiment, the duty ratio is changed as the voltage pattern applied to the collecting roller 52 in the toner removal mode, but the duty ratio is further changed according to the environment. Other configurations and operations are the same as those of the first embodiment described above.

Here, in the high-humidity environment, the ratio of the reversely charged toner contained in the toner on the photosensitive drum 28Y is high, and as a result, the ratio of the reverse component toner adhering to the collecting roller 52 is high. On the other hand, the ratio of the reverse component toner is low in a low-humidity environment. Therefore, in the present embodiment, the duty ratio of the bias applied to the collecting roller 52 is changed according to the humidity.

That is, in the toner removal mode (second mode) of the present embodiment, the controller 101 changes the bias pattern (first voltage pattern and second voltage pattern) of the toner removal mode based on the relative humidity detected by the relative humidity detection unit 140 serving as the humidity detector. Specifically, when the relative humidity detected by the relative humidity detection unit 140 is a first humidity, the controller 101 applies, to the collecting roller 52, a voltage in which the duty ratio of the first voltage pattern is a first value and the duty ratio of the second voltage pattern is a second value in the second mode. On the other hand, when the relative humidity detected by the relative humidity detection unit 140 is a second humidity higher than the first humidity, the controller 101 applies, to the collecting roller 52, a voltage in which the duty ratio of the first voltage pattern is a third value smaller than the first value and the duty ratio of the second voltage pattern is a fourth value smaller than the second value in the second mode.

Figure 16A:
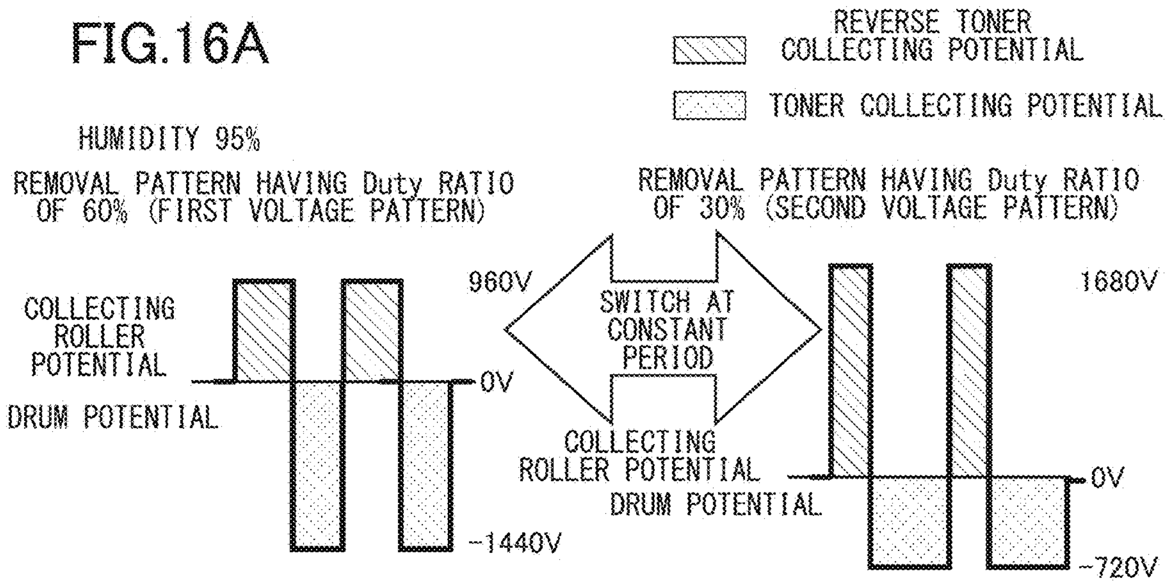
FIG. 16A is a schematic diagram illustrating a first voltage pattern and a second voltage pattern in a toner removal mode in a high-humidity environment according to a third embodiment.
Figure 16B:
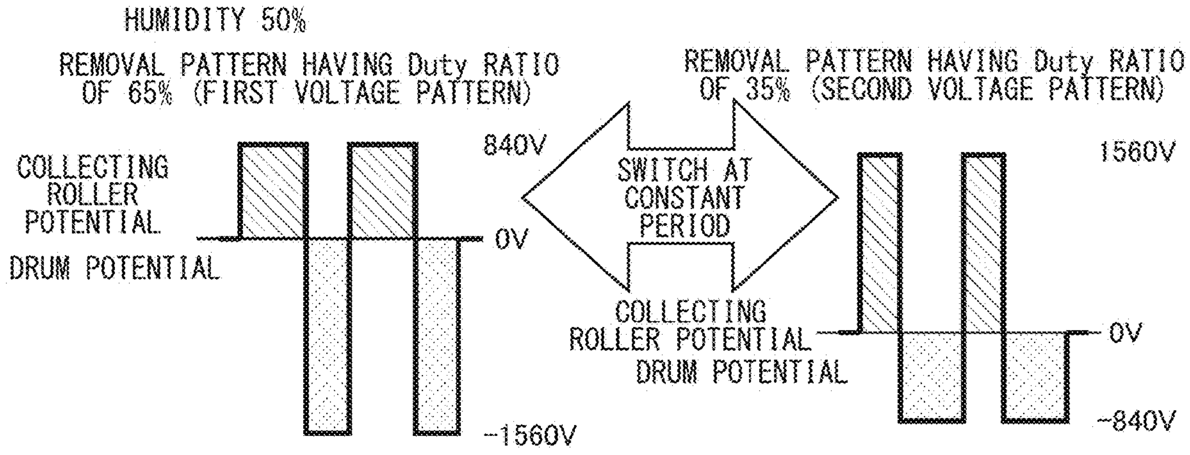
FIG. 16B is a schematic diagram illustrating a first voltage pattern and a second voltage pattern in a toner removal mode in a normal-humidity environment according to the third embodiment.
Figure 16C:
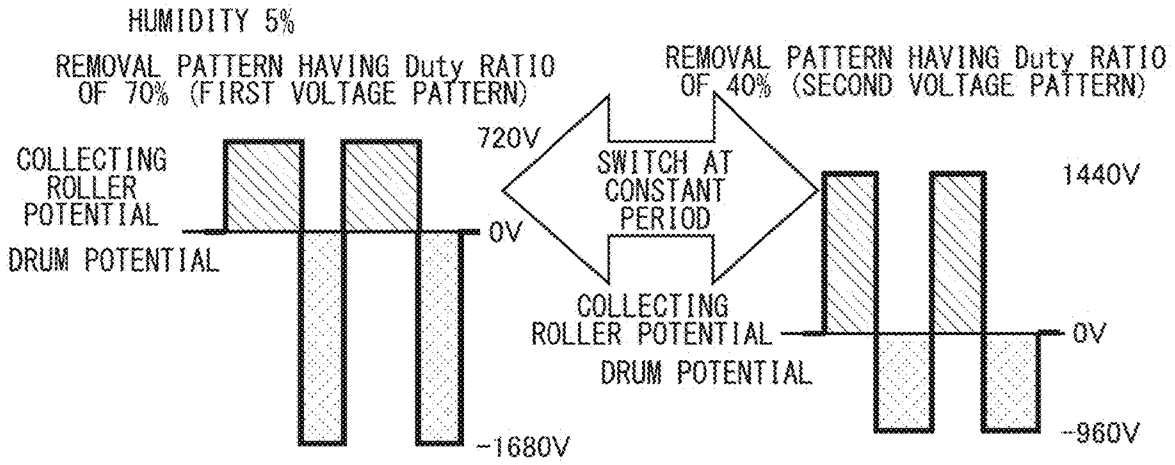
FIG. 16C is a schematic diagram illustrating a first voltage pattern and a second voltage pattern in a toner removal mode in a low-humidity environment according to the third embodiment.

FIGS. 16A to 16C illustrate bias patterns (a first voltage pattern and a second voltage pattern) in the toner removal mode in the present embodiment. In the first embodiment, biases with duty ratios of 65% and 35% are applied regardless of the environmental humidity. On the other hand, in the present embodiment, in a high-humidity environment, for example, at a humidity of 95%, as illustrated in FIG. 16A, bias patterns having a duty ratio of 60% (first voltage pattern) and 30% (second voltage pattern) are switched at a constant period and applied to the collecting roller 52. In addition, in a normal-humidity environment, for example, at a humidity of 50%, as illustrated in FIG. 16B, bias patterns having a duty ratio of 65% (first voltage pattern) and 35% (second voltage pattern) are switched at a constant period and applied to the collecting roller 52. Furthermore, in a low-humidity environment, for example, at a humidity of 5%, the bias patterns having a duty ratio of 70% (first voltage pattern) and 40% (second voltage pattern) are switched at a constant period and applied to the collecting roller 52.

For example, when the duty ratio of 65% in a normal-humidity environment is a first value and the duty ratio of 35% is a second value, the duty ratio of 60% in a high-humidity environment corresponds to a third value and the duty ratio of 30% corresponds to a fourth value. The same applies to the duty ratio in the relationship between the low-humidity environment and the normal-humidity environment and the duty ratio in the relationship between the low-humidity environment and the high-humidity environment.

Figure 17:
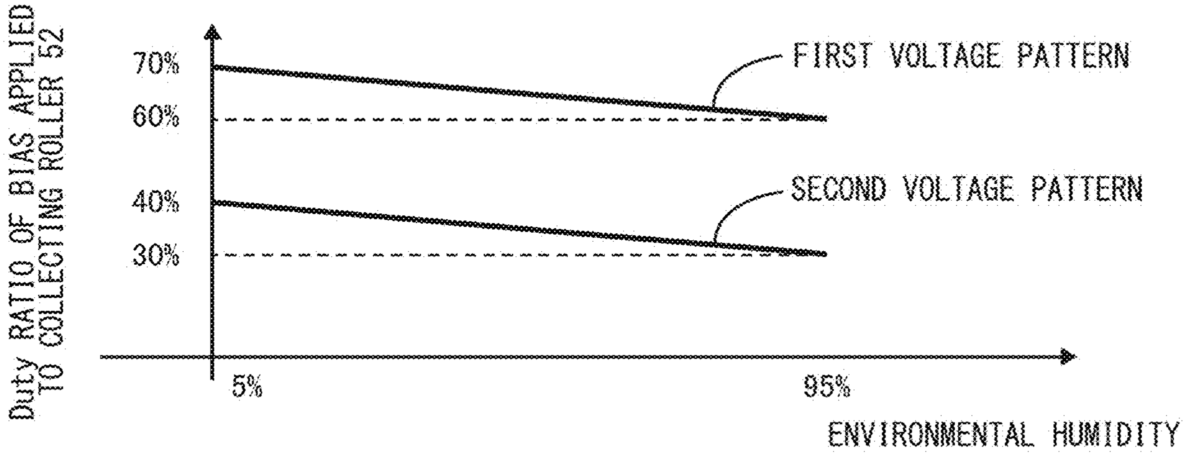
FIG. 17 is a graph illustrating a relationship between a first voltage pattern and a second voltage pattern in a toner removal mode according to the third embodiment and environmental humidity.

In the present embodiment, the duty ratio of each bias pattern according to the humidity is continuously changed as illustrated in FIG. 17. That is, the controller 101 determines the bias pattern in the toner removal mode by referring to the table of FIG. 17 according to the relative humidity detected by the relative humidity detection unit 140. Note that the bias pattern may be determined according to a plurality of categories of relative humidity without depending on the table of FIG. 17. For example, a bias pattern having a duty ratio of 70% (first voltage pattern) and 40% (second voltage pattern) may be determined as a low-humidity environment when the relative humidity is 0% or more and less than 30%, a bias pattern having a duty ratio of 65% (first voltage pattern) and 35% (second voltage pattern) may be determined as a normal-humidity environment when the relative humidity is 30% or more and less than 70%, and a bias pattern having a duty ratio of 60% (first voltage pattern) and 30% (second voltage pattern) may be determined as a high-humidity environment when the relative humidity is 70% or more. That is, it may be determined in stages.

In any case, in the present embodiment, since the duty ratio is changed according to the relative humidity, the toner on the collecting roller 52 can be removed more effectively. The sequence until entering the toner removal mode of the present embodiment is similar to that of the first embodiment described with reference to FIG. 11.

Sequence of Toner Removal Mode of Present Embodiment

Figure 18:
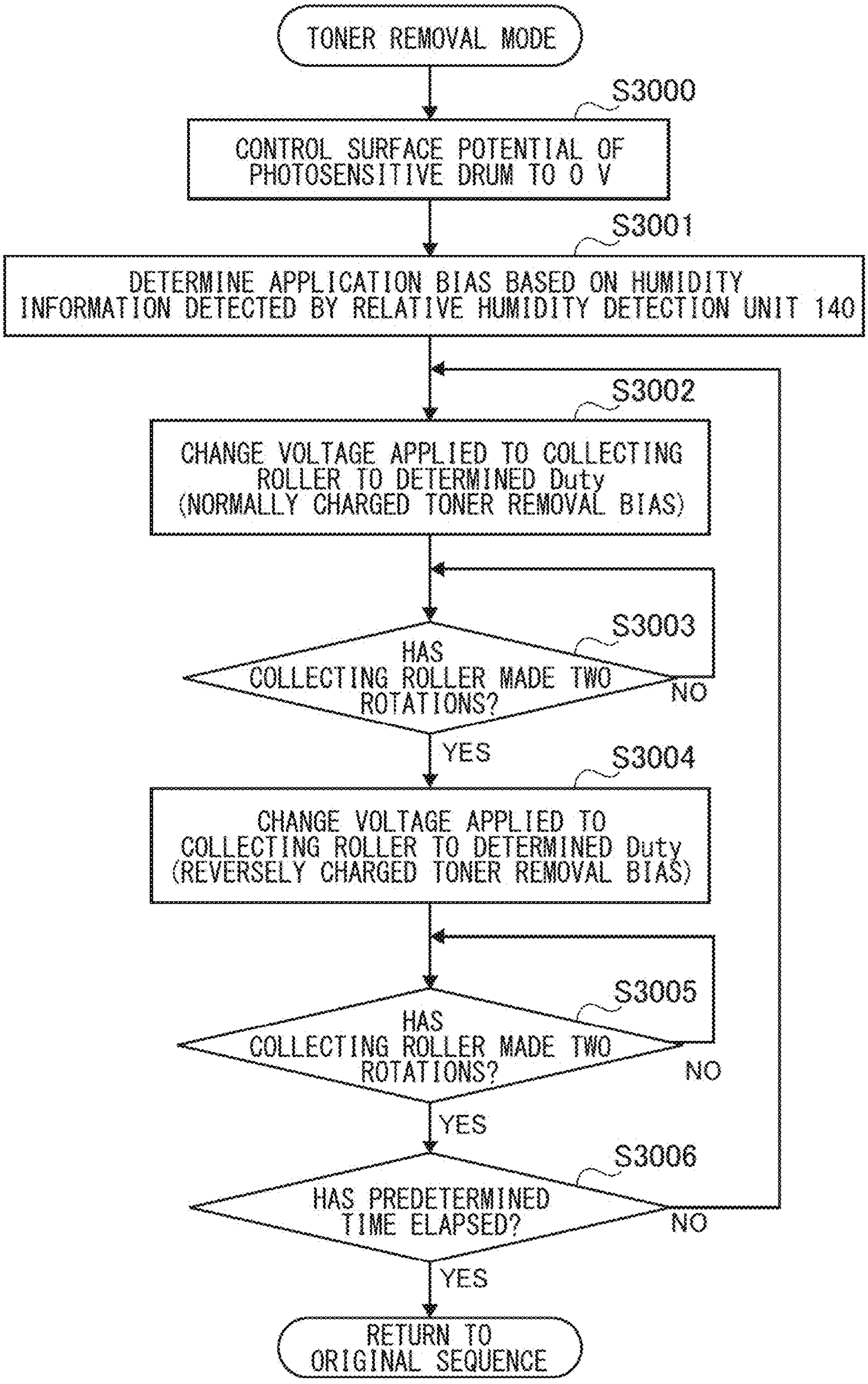
FIG. 18 is a flowchart during image forming and a toner removal mode according to the third embodiment.

Next, a sequence of the toner removal mode in the present embodiment will be described with reference to FIG. 18. In S105 of FIG. 11, when the toner removal mode starts, first, the surface potential of the photosensitive drum 28Y is controlled to 0 V (S3000). The method of controlling the surface potential of the photosensitive drum 28Y to 0 V is similar to that in the first embodiment. Next, in the present embodiment, the controller 101 checks the humidity information of the relative humidity detection unit 140 and determines the duty ratios of the two types of AC biases to be applied to the collecting roller 52 based on the table of FIG. 17 (S3001). Next, the controller 101 changes the voltage applied to the collecting roller 52 using the collecting high-voltage substrate 130 to the AC bias (first voltage pattern) of the normally charged toner removal duty determined in S3001 (S3002). Accordingly, the normally charged toner adhering to the collecting roller 52 is removed.

After applying the bias of the first voltage pattern for the time corresponding to two rotations of the collecting roller 52 (S3003), the controller 101 changes the voltage applied to the collecting roller 52 to the AC bias (second voltage pattern) of the reversely charged toner removal duty determined in S3001 using the collecting high-voltage substrate 130 (S3004). As a result, the reversely charged toner adhering to the collecting roller 52 is removed.

After the bias of the second voltage pattern is applied for the time corresponding to two rotations of the collecting roller 52 (S3005), the sequence from S3002 to S3005 is continued until a predetermined time elapses (S3006). The predetermined time here is a time set in advance as an execution time of the toner removal mode. The time is preset as the execution time of the mode. The predetermined time is, for example, 30 seconds.

Experiment 3

In order to confirm the effect of the present embodiment, experiments similar to Experiments 1 and 2 described in the first and second embodiments were performed. Comparative Examples 1 and 2 and Example 1 are the same as Experiment 1, and Example 2 is the same as Experiment 2. In Experiment 3, Example 3 in which the sequence of the toner removal mode of the present embodiment was performed was also examined. In Experiment 3, the soiling of the collecting roller 52 when the humidity was changed from normal humidity to high humidity was examined in Comparative Examples 1 and 2 and Examples 1, 2, and 3. The results are shown in Table 3.

TABLE 3

| | Toner removal mode | Soiling of toner on collecting roller | Downtime | Soiling of toner on collecting roller when humidity is changed (during high humidity) |
|---|---|---|---|---|
| Comparative example 1 | None | Dripping | None | Dripping |
| Comparative example 2 | AC + generating a peripheral speed difference | No dripping | Large | Almost no dripping |
| Example 1 | Switching duty ratio of AC | No dripping | Small | Almost no dripping |
| Example 2 | Switching of DC | No dripping | Small | Almost no dripping |
| Example 3 | Switching duty ratio according to environment | No dripping | Small | No dripping |

As is apparent from Table 3, in Example 3, the occurrence of dripping could be prevented as in Comparative Example 2 while the downtime was suppressed as in Example 1. Further, in Comparative Example 2 and Examples 1 and 2, dripping slightly occurred in a high-humidity environment, but the dripping did not affect the image. On the other hand, in Example 3, dripping did not occur even in a high-humidity environment. As a result, in the present embodiment, it has been found that the toner removal efficiency can be maintained even when the environmental humidity changes.

Fourth Embodiment

A fourth embodiment will be described with reference to FIGS. 19 to 20. In the present embodiment, as in the first embodiment, the duty ratio is changed as the voltage pattern applied to the collecting roller 52 in the toner removal mode, but the application time of the voltage pattern is changed according to the environment. Other configurations and operations are the same as those of the first embodiment described above.

In the third embodiment described above, the duty ratio of the bias applied to the collecting roller 52 is changed according to the environmental humidity, but in the present embodiment, the ratio of the time for applying the bias to the collecting roller 52 is changed according to the environmental humidity. Furthermore, in the first embodiment described above, the time for applying the first voltage pattern and the second voltage pattern is the same regardless of the environmental humidity, whereas in the present embodiment, since the ratio of the reverse toner is high in the high-humidity environment, the bias for removing the reverse toner is applied for a long time. That is, the application time of the second voltage pattern is increased. On the other hand, the removal bias of the normally charged toner shortens the time accordingly. That is, the application time of the first voltage pattern is decreased.

That is, in the toner removal mode (second mode) of the present embodiment, the controller 101 changes the bias pattern (first voltage pattern and second voltage pattern) of the toner removal mode based on the relative humidity detected by the relative humidity detection unit 140 serving as the humidity detector. Specifically, when the relative humidity detected by the relative humidity detection unit 140 is a first humidity, the controller 101 applies, to the collecting roller 52, a voltage in which the time for applying the first voltage pattern is a first time and the time for applying the second voltage pattern is a second time in the second mode. On the other hand, when the relative humidity detected by the relative humidity detection unit 140 is a second humidity higher than the first humidity, in the second mode, the controller 101 applies, to the collecting roller 52, a voltage for which the time for applying the first voltage pattern is a third time shorter than the first time and the time for applying the second voltage pattern is a fourth time longer than the second time.

More specifically, in the normal-humidity environment, similarly to the first embodiment, the application time of the bias having the duty ratio of 65% (first voltage pattern) and the application time of the bias having the duty ratio of 35% (second voltage pattern) are the same, and are each two times the rotation period of the collecting roller 52. On the other hand, in a high-humidity environment, for example, at a humidity of 95%, the application time of the bias having the duty ratio of 65% (first voltage pattern) is changed to one time the rotation period of the collecting roller 52, and the application time of the bias having the duty ratio of 35% (second voltage pattern) is changed to three times the rotation period of the collecting roller 52, with respect to the normal-humidity environment. In addition, in a low-humidity environment, for example, at a humidity of 5%, the application time of the bias having the duty ratio of 65% (first voltage pattern) is changed to three times the rotation period of the collecting roller 52, and the application time of the bias having the duty ratio of 35% (second voltage pattern) is changed to one time the rotation period of the collecting roller 52, with respect to the normal-humidity environment.

For example, when the application time of the first voltage pattern and the second voltage pattern in the normal-humidity environment is the first time and the second time (two times the rotation period of the collecting roller 52), respectively, the application time of the first voltage pattern in the high-humidity environment (one time the rotation period of the collecting roller 52) corresponds to the third time, and the application time of the second voltage pattern (three times the rotation period of the collecting roller 52) corresponds to the fourth time. The same applies to the application time in the relationship between the low-humidity environment and the normal-humidity environment and the application time in the relationship between the low-humidity environment and the high-humidity environment.

Figure 19:
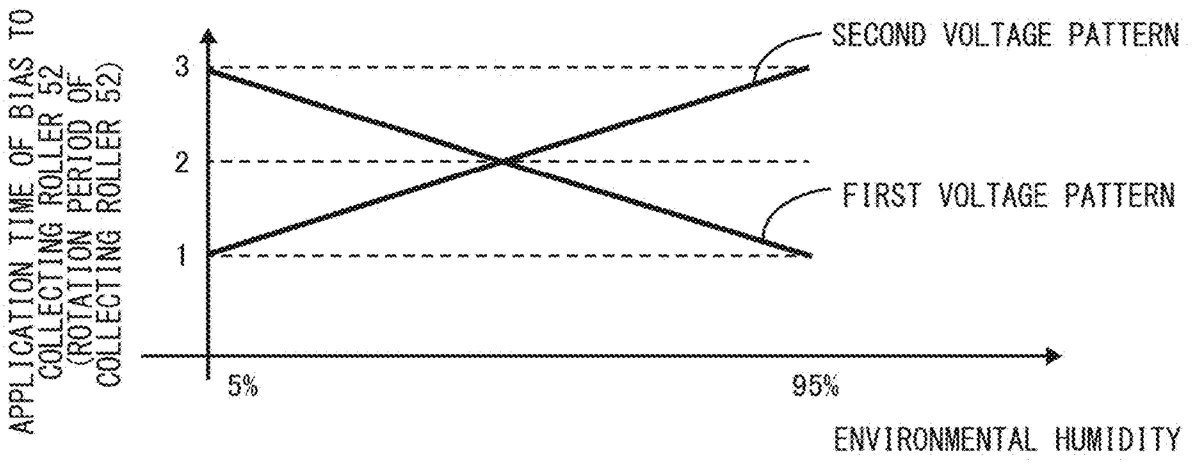
FIG. 19 is a graph illustrating a relationship between a first voltage pattern and a second voltage pattern in a toner removal mode according to a fourth embodiment and environmental humidity.
Figure 20:
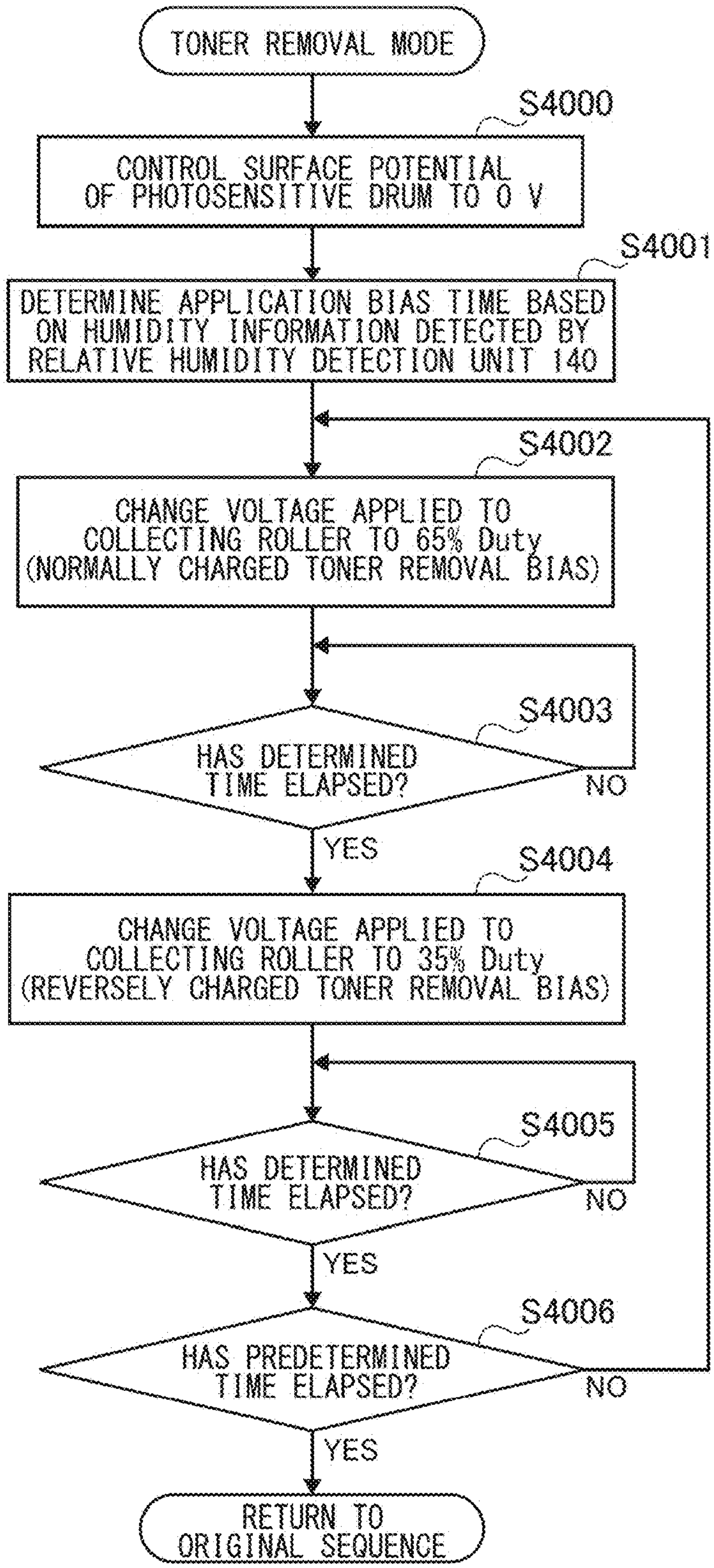
FIG. 20 is a flowchart during image forming and a toner removal mode according to the fourth embodiment.

In the present embodiment, the change timing of switching the bias patterns according to the humidity is continuously changed as illustrated in FIG. 19. That is, the controller 101 determines the bias pattern application time in the toner removal mode by referring to the table of FIG. 19 according to the relative humidity detected by the relative humidity detection unit 140. Note that the application time of the bias pattern may be determined according to a plurality of categories of relative humidity without depending on the table of FIG. 19. For example, when the relative humidity is 0% or more and less than 30%, the application time of the first voltage pattern may be determined to be three times the rotation period of the collecting roller 52, and the application time of the second voltage pattern may be determined to be one time the rotation period of the collecting roller 52 as a low-humidity environment. When the relative humidity is 30% or more and less than 70%, the application time of the first voltage pattern and the application time of the second voltage pattern may be determined to be two times the rotation period of the collecting roller 52 as a normal-humidity environment. When the relative humidity is 70% or more, the application time of the first voltage pattern may be determined to be one time the rotation period of the collecting roller 52, and the application time of the second voltage pattern may be determined to be three times the rotation period of the collecting roller 52 as a high-humidity environment.

In any case, in the present embodiment, since the duty ratio is appropriately changed according to the relative humidity, the toner on the collecting roller 52 can be more effectively removed. The sequence until entering the toner removal mode of the present embodiment is similar to that of the first embodiment described with reference to FIG. 11.

Sequence of Toner Removal Mode of Present Embodiment

Next, a sequence of the toner removal mode in the present embodiment will be described with reference to FIG. 20. In S105 of FIG. 11, when the toner removal mode starts, first, the surface potential of the photosensitive drum 28Y is controlled to 0 V (S4000). The method of controlling the surface potential of the photosensitive drum 28Y to 0 V is similar to that in the first embodiment. Next, in the present embodiment, the controller 101 checks the humidity information of the relative humidity detection unit 140 and determines application times of the two types of AC biases to be applied to the collecting roller 52 based on the table of FIG. 19 (S4001). Next, the controller 101 changes the voltage applied to the collecting roller 52 to an AC bias having a duty ratio of 65% (first voltage pattern) using the collecting high-voltage substrate 130 (S4002). Accordingly, the normally charged toner adhering to the collecting roller 52 is removed. At this time, the controller 101 applies the first voltage pattern to the collecting roller 52 for the time determined in S4001 (S4003).

Next, the controller 101 changes the voltage applied to the collecting roller 52 to an AC bias (second voltage pattern) having a duty ratio of 35% using the collecting high-voltage substrate 130 (S4004). As a result, the reversely charged toner adhering to the collecting roller 52 is removed. At this time, the controller 101 applies the second voltage pattern to the collecting roller 52 for the time determined in S4001 (S4005). The sequence from S4002 to S4005 is continued until a predetermined time elapses (S4006). The predetermined time here is a time set in advance as an execution time of the toner removal mode. The predetermined time is, for example, 60 seconds. In the present embodiment in which the rotational speed of the photosensitive drum 28Y is not reduced when the bias patterns according to the humidity are alternately applied to the collecting roller 52, it has been confirmed that the same effect can be obtained as the toner removal efficiency of the collecting roller 52. On the other hand, when the bias patterns according to the humidity are alternately applied to the collecting roller 52, the toner removal efficiency of the collecting roller 52 increases even in a case where the rotational speed of the photosensitive drum 28Y is decreased. In a case where the rotational speed of the photosensitive drum 28Y is not decreased when the bias patterns corresponding to the humidity are alternately applied to the collecting roller 52, the time required for the control can be decreased (for example, decreased from 60 seconds to 30 seconds) as compared with a case where the rotational speed of the photosensitive drum 28Y is decreased.

Experiment 4

In order to confirm the effect of the present embodiment, experiments similar to Experiments 1, 2, and 3 described in the first, second, and third embodiments were performed. Comparative Examples 1 and 2 and Example 1 are the same as Experiment 1, Example 2 is the same as Experiment 2, and Example 3 is the same as Experiment 3. In Experiment 4, Example 4 in which the sequence of the toner removal mode of the present embodiment was performed was also examined. In Experiment 4, similarly to Experiment 3, the soiling of the collecting roller 52 when the humidity was changed from normal humidity to high humidity was examined. The results are shown in Table 4.

TABLE 4

| | Toner removal mode | Soiling of toner on collecting roller | Downtime | Soiling of toner on collecting roller when humidity is changed (during high humidity) |
|---|---|---|---|---|
| Comparative example 1 | None | Dripping | None | Dripping |
| Comparative example 2 | AC + generating a peripheral speed difference | No dripping | Large | Almost no dripping |
| Example 1 | Switching duty ratio of AC | No dripping | Small | Almost no dripping |
| Example 2 | Switching of DC | No dripping | Small | Almost no dripping |
| Example 3 | Switching duty ratio according to environment | No dripping | Small | No dripping |
| Example 4 | Switching application time according to environment | No dripping | Small | No dripping |

As is apparent from Table 4, in Example 4, the occurrence of dripping could be prevented as in Comparative Example 2 while the downtime was suppressed as in Example 1. In Example 4, dripping did not occur even in a high-humidity environment as in Example 3. As a result, also in the present embodiment, it was found that the toner removal efficiency can be maintained even when the environmental humidity changes.

Fifth Embodiment

A fifth embodiment will be described with reference to FIGS. 21A to 23. In the present embodiment, as in the first embodiment, the duty ratio is changed as the voltage pattern to be applied to the collecting roller 52 in the toner removal mode, but the DC component of the bias to be applied to the collecting roller 52 is changed according to the environmental humidity. Other configurations and operations are the same as those of the first embodiment described above.

In the third and fourth embodiments described above, the duty ratio of the bias applied to the collecting roller 52 and the ratio of the application time are changed according to the environmental humidity. However, in the present embodiment, the DC component of the bias applied to the collecting roller 52 is changed according to the environmental humidity. Furthermore, in the first embodiment described above, the DC component to which the first voltage pattern and the second voltage pattern are applied is the same regardless of the environmental humidity, whereas in the present embodiment, since the ratio of the reverse toner is high in the high-humidity environment (for example, humidity 95%), the DC bias is applied in the direction of removing the reverse toner. That is, in the reverse toner removal bias, since a negative DC bias (for example, −500 V) is applied to the collecting roller 52, the collection voltage of the reverse toner increases by the amount of application of the DC bias. On the other hand, in the present embodiment, since the ratio of the reverse toner is low in a low-humidity environment (for example, humidity 5%), a DC bias is applied in a direction in which the normally charged toner is removed. That is, in the removal bias of the normally charged toner, since a DC bias (for example, +500 V) on the positive side is applied to the collecting roller 52, the collection voltage of the reverse toner decreases by the amount of the DC bias applied.

That is, in the toner removal mode (second mode) of the present embodiment, the controller 101 changes the bias pattern (first voltage pattern and second voltage pattern) of the toner removal mode based on the relative humidity detected by the relative humidity detection unit 140 serving as the humidity detector. Specifically, when the relative humidity detected by the relative humidity detection unit 140 is high humidity or low humidity, the controller 101 applies a DC bias to the collecting roller 52 in accordance with the environmental humidity in each of the first voltage pattern and the second voltage pattern in the second mode.

Figure 21A:
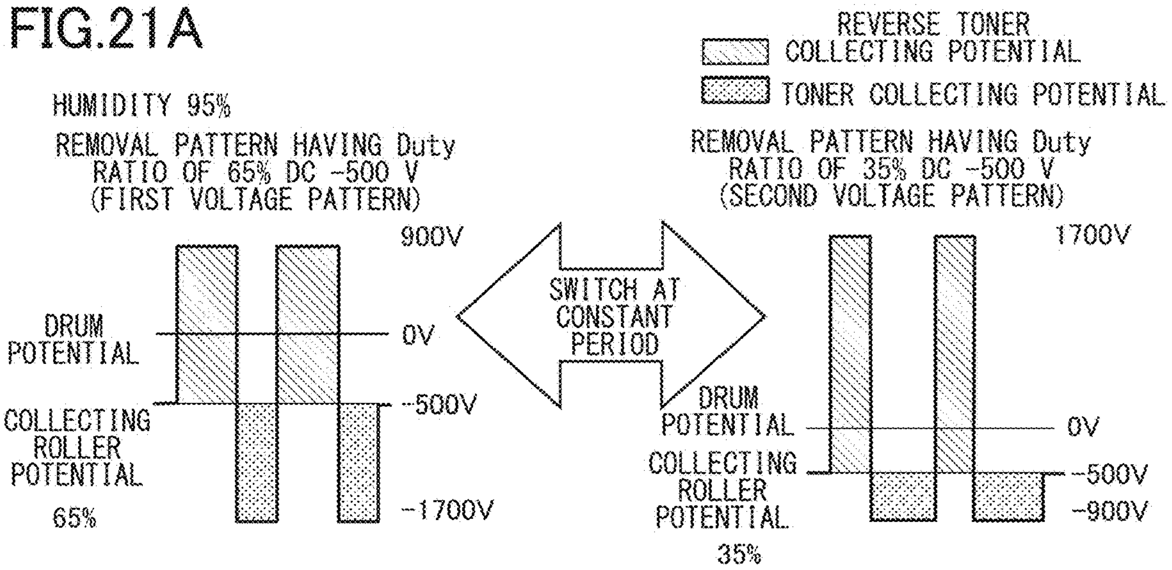
FIG. 21A is a schematic diagram illustrating a first voltage pattern and a second voltage pattern in a toner removal mode in a high-humidity environment according to a fifth embodiment.
Figure 21B:
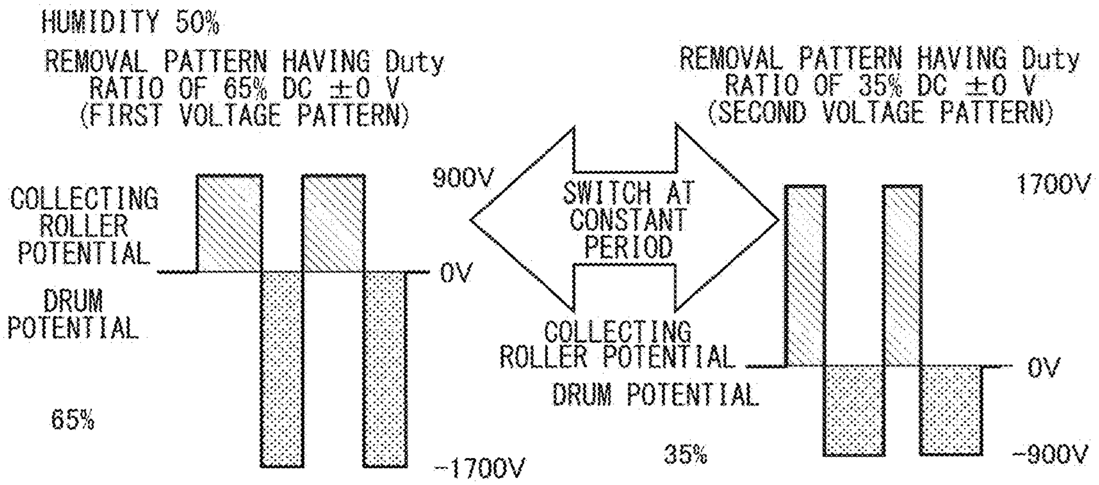
FIG. 21B is a schematic diagram illustrating a first voltage pattern and a second voltage pattern in a toner removal mode in a normal-humidity environment according to the fifth embodiment.
Figure 21C:
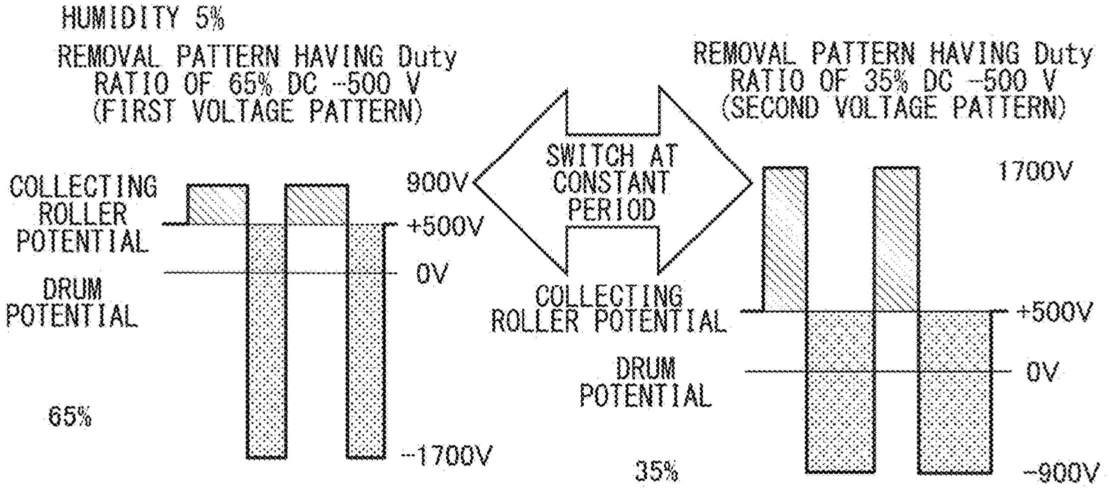
FIG. 21C is a schematic diagram illustrating a first voltage pattern and a second voltage pattern in a toner removal mode in a low-humidity environment according to the fifth embodiment.

More specifically, as illustrated in FIG. 21B, in the normal-humidity environment (humidity 50%), similarly to the first embodiment, the DC component of the bias having the duty ratio of 65% (first voltage pattern) and the DC component of the bias having the duty ratio of 35% (second voltage pattern) are the same, and the potentials of the collecting roller 52 and the photosensitive drum 28 are the same. On the other hand, in a high-humidity environment, for example, at a humidity of 95%, the difference in the DC bias of the collecting roller 52 with respect to the photosensitive drum 28 is changed to −500 V having a large effect of collecting the reversely charged toner, as illustrated in FIG. 21A. In addition, in a low-humidity environment, for example, at a humidity of 5%, as illustrated in FIG. 21C, the difference in the DC bias of the collecting roller 52 with respect to the photosensitive drum 28 is changed to +500 V having a large effect of collecting the normally charged toner.

Figure 22:
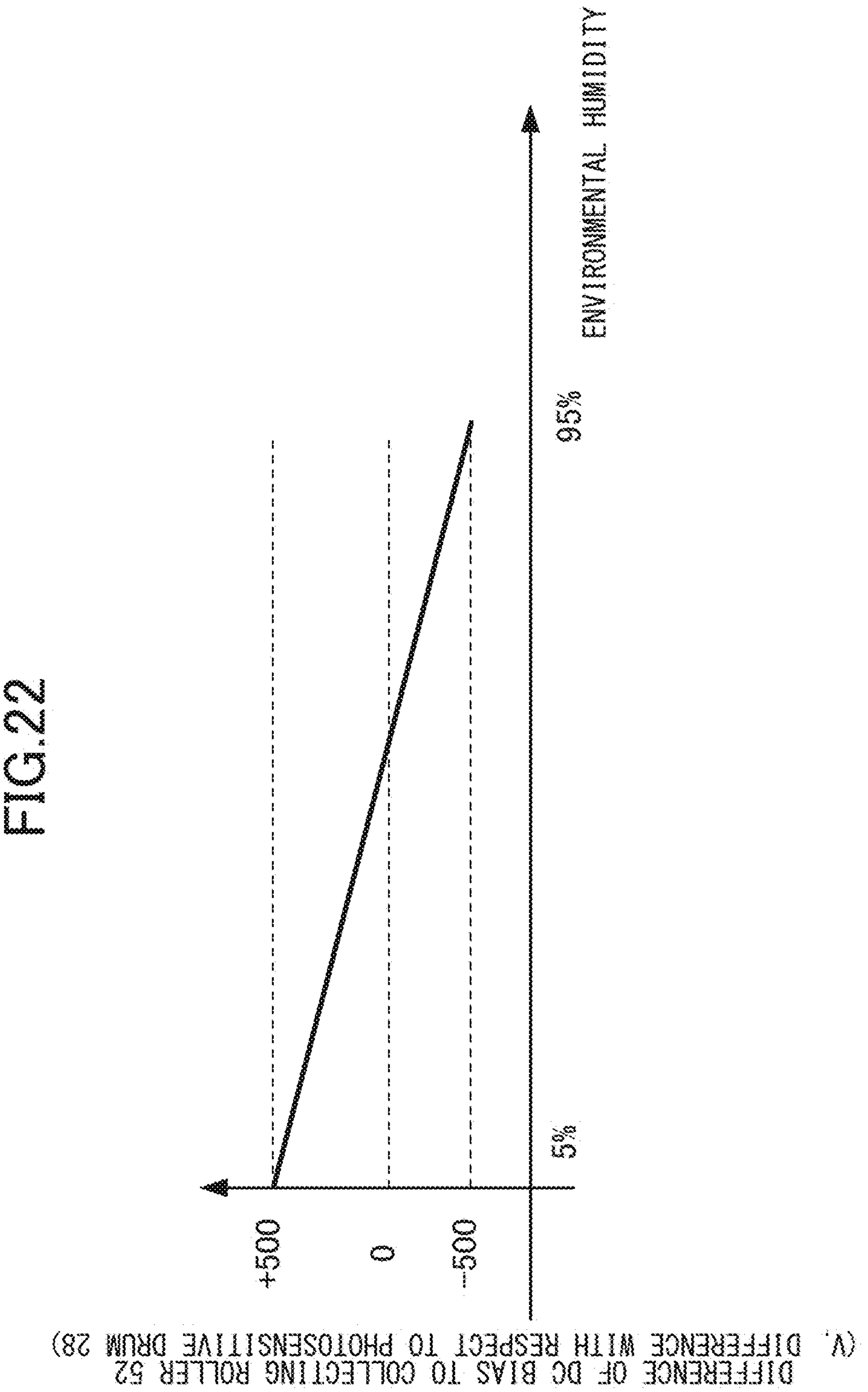
FIG. 22 is a graph illustrating a relationship between a difference in DC bias and environmental humidity in a toner removal mode according to the fifth embodiment.

In the present embodiment, the difference of the DC bias of the collecting roller 52 with respect to the photosensitive drum 28 according to the humidity is continuously changed as illustrated in FIG. 22. That is, the controller 101 determines the difference of the DC bias in the toner removal mode by referring to the table of FIG. 22 according to the relative humidity detected by the relative humidity detection unit 140. Note that the difference between the DC biases may be determined according to a plurality of categories of relative humidity without depending on the graph of FIG. 22. For example, when the relative humidity is 0% or more and less than 30%, the DC bias difference may be determined to be −500 V as a low-humidity environment, when the relative humidity is 30% or more and less than 70%, the DC bias difference may be determined to be 0 V as a normal-humidity environment, and when the relative humidity is 70% or more, the DC bias difference may be determined to be +500 V as a high-humidity environment.

In any case, in the present embodiment, since the difference of the DC bias is appropriately changed according to the relative humidity, the toner on the collecting roller 52 can be more effectively removed. The sequence until entering the toner removal mode of the present embodiment is similar to that of the first embodiment described with reference to FIG. 11.

Sequence of Toner Removal Mode of Present Embodiment

Figure 23:
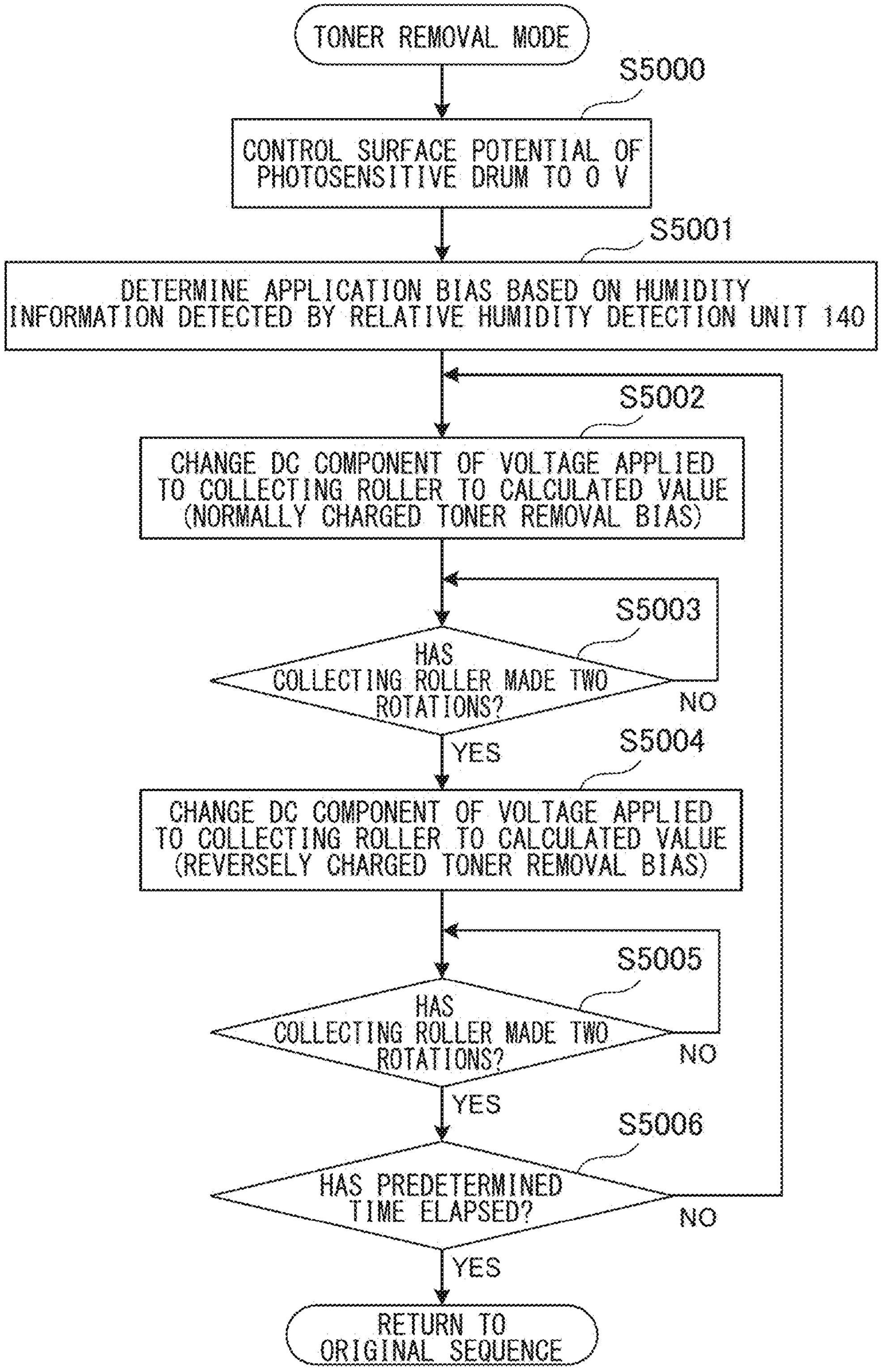
FIG. 23 is a flowchart during image forming and a toner removal mode according to the fifth embodiment.

Next, a sequence of the toner removal mode in the present embodiment will be described with reference to FIG. 23. In FIG. 23, in the toner removal mode, first, the surface potential of the photosensitive drum 28Y is controlled to 0 V (S5000). The method of controlling the surface potential of the photosensitive drum 28Y to 0 V is similar to that in the first embodiment. Next, in the present embodiment, the controller 101 checks the humidity information of the relative humidity detection unit 140 and determines the difference in the DC bias in the toner removal mode based on the graph of FIG. 22 (S5001). Next, the controller 101 changes the voltage applied to the collecting roller 52 to an AC bias having a duty ratio of 65% (first voltage pattern) using the collecting high-voltage substrate 130 (S5002). Accordingly, the normally charged toner adhering to the collecting roller 52 is removed. At this time, the controller 101 applies the first voltage pattern to the collecting roller 52 until the time corresponding to two rotations of the collecting roller 52 elapses (S5003).

Next, the controller 101 changes the voltage applied to the collecting roller 52 to an AC bias (second voltage pattern) having duty ratio of 35% using the collecting high-voltage substrate 130 (S5004). As a result, the reversely charged toner adhering to the collecting roller 52 is removed. At this time, the controller 101 applies the second voltage pattern to the collecting roller 52 based on the difference of the DC bias determined in S5001 (S5005). At this time, the controller 101 applies the second voltage pattern to the collecting roller 52 until the time corresponding to two rotations of the collecting roller 52 elapses (S5005). Then, the controller 101 continues the sequence from S5002 to S5005 until a predetermined time elapses from the start of the toner removal mode (S5006). The predetermined time here is a time set in advance as an execution time of the toner removal mode, and is, for example, 60 seconds. In the present embodiment in which the rotational speed of the photosensitive drum 28Y is not reduced when the bias patterns according to the humidity are alternately applied to the collecting roller 52, it has been confirmed that the same effect can be obtained as the toner removal efficiency of the collecting roller 52. On the other hand, when the bias patterns according to the humidity are alternately applied to the collecting roller 52, the toner removal efficiency of the collecting roller 52 increases even in a case where the rotational speed of the photosensitive drum 28Y is decreased. In a case where the rotational speed of the photosensitive drum 28Y is not decreased when the bias patterns corresponding to the humidity are alternately applied to the collecting roller 52, the time required for the control can be decreased (for example, decreased from 60 seconds to 30 seconds) as compared with a case where the rotational speed of the photosensitive drum 28Y is decreased.

Experiment 5

In order to confirm the effect of the present embodiment, experiments similar to Experiments 1, 2, 3, and 4 described in the first, second, third, and fourth embodiments were performed. Comparative Examples 1 and 2 and Example 1 are the same as Experiment 1, Example 2 is the same as Experiment 2, Example 3 is the same as Experiment 3, and Example 4 is the same as Experiment 4. In Experiment 5, Example 5 in which the sequence of the toner removal mode of the present embodiment was performed was also examined. In Experiment 5, similarly to Experiments 3 and 4, the soiling of the collecting roller 52 when the humidity was changed from normal humidity to high humidity was examined. The results are shown in Table 5.

TABLE 5

| | Toner removal mode | Soiling of toner on collecting roller | Downtime | Soiling of toner on collecting roller when humidity is changed (during high humidity) |
|---|---|---|---|---|
| Comparative example 1 | None | Dripping | None | Dripping |
| Comparative example 2 | AC + generating a peripheral speed difference | No dripping | Large | Almost no dripping |
| Example 1 | Switching duty ratio of AC | No dripping | Small | Almost no dripping |
| Example 2 | Switching of DC | No dripping | Small | Almost no dripping |
| Example 3 | Switching duty ratio according to environment | No dripping | Small | No dripping |
| Example 4 | Switching application time according to environment | No dripping | Small | No dripping |
| Example 5 | Switching DC bias component according to environment in addition to switching duty ratio of AC | No dripping | Small | No dripping |

As is apparent from Table 5, in Example 5, the occurrence of dripping could be prevented as in Comparative Example 2 while the downtime was suppressed as in Example 1. In Example 5, dripping did not occur even in a high-humidity environment as in Examples 3 and 4. As a result, in the present embodiment, it has been found that the toner removal efficiency can be maintained even when the environmental humidity changes.

Other Embodiments

The present invention is not limited to the configuration of each embodiment described above. For example, the image forming apparatus 100 is not limited to the MFP, and may be a copier, a printer, or a facsimile machine. Further, the configurations of the developer supply screw 42, the developer stirring screw 43, and the developer collecting screw 44 are not particularly limited as long as the developer can be conveyed, and for example, a spiral blade or a paddle blade can be applied. In addition, although the configuration in which the developing unit of each of the above-described embodiments includes two developing rollers has been described, the configuration may include one developing roller.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-130216, filed Aug. 9, 2023, and Japanese Patent Application No. 2024-094068, filed Jun. 11, 2024, which are hereby incorporated by reference herein in their entirety.

What is claimed is:

1. An image forming apparatus configured to execute an image forming operation, the image forming apparatus comprising:

a rotatable image bearing member on which an electrostatic latent image is formed;

a developing unit including a developer container that accommodates a developer including a toner and a carrier, and a developer bearing member that bears the developer to develop the electrostatic latent image formed on the image bearing member into a toner image;

a transfer member to which the toner image borne on the image bearing member is transferred;

a carrier collecting device that includes a rotatable sleeve disposed to face the image bearing member and a magnet non-rotatably disposed inside the sleeve, and collects the carrier on the image bearing member, a bias application unit that applies a bias including an AC voltage to the sleeve; and a controller that controls the bias application unit, wherein the sleeve is disposed downstream of a development position at which the electrostatic latent image formed on the image bearing member is developed and upstream of a transfer position at which the toner image borne on the image bearing member is transferred to the transfer member, in a rotation direction of the image bearing member, the controller controls the bias application unit to apply a first bias to the sleeve during the image forming operation, and controls the bias application unit to apply a second bias to the sleeve in a predetermined mode during non-image forming, and when, in one period of the AC voltage of the bias applied to the sleeve by the bias application unit, a duration of a voltage of a reverse polarity to a charging polarity of the toner with respect to a DC potential of the sleeve is t1, a duration of a voltage of a same polarity as the charging polarity of the toner with respect to the DC potential of the sleeve is t2, and a ratio of t1 with respect to one period (t1+t2) of the AC voltage of the bias applied to the sleeve by the bias application unit is a duty ratio, a duty ratio of the AC voltage of the second bias is lower than a duty ratio of the AC voltage of the first bias.

2. The image forming apparatus according to claim 1, wherein the duty ratio of the AC voltage of the second bias is lower than 50%.

3. The image forming apparatus according to claim 1, wherein the duty ratio of the AC voltage of the second bias is 40% or less.

4. The image forming apparatus according to claim 1, wherein the duty ratio of the AC voltage of the first bias is 50%.

5. The image forming apparatus according to claim 1, wherein the controller controls the bias application unit to alternately apply the second bias and a third bias to the sleeve in the predetermined mode, and a duty ratio of the AC voltage of the third bias is higher than the duty ratio of the AC voltage of the first bias.

6. The image forming apparatus according to claim 5, wherein the duty ratio of the AC voltage of the second bias is lower than 50%, and the duty ratio of the AC voltage of the third bias is higher than 50%.

7. The image forming apparatus according to claim 5, wherein the duty ratio of the AC voltage of the second bias is 40% or less, and the duty ratio of the AC voltage of the third bias is 60% or more.

8. The image forming apparatus according to claim 5, wherein the duty ratio of the AC voltage of the first bias is 50%.

9. The image forming apparatus according to claim 1, wherein in the predetermined mode, an absolute value of the DC potential of the sleeve is the same as an absolute value of a DC potential of the image bearing member.

10. The image forming apparatus according to claim 1, wherein during the image forming operation, a polarity of a DC potential of the image bearing member and a polarity of the DC potential of the sleeve are the same as the charging polarity of the toner, and an absolute value of the DC potential of the sleeve is larger than an absolute value of the DC potential of the image bearing member.

11. The image forming apparatus according to claim 1, wherein the first bias is a bias that is superimposed with a DC voltage and the AC voltage, and the second bias is a bias that consists of the AC voltage only.

12. An image forming apparatus configured to execute an image forming operation, the image forming apparatus comprising:

a rotatable image bearing member on which an electrostatic latent image is formed;

a developing unit including a developer container that accommodates a developer including a toner and a carrier, and a developer bearing member that bears the developer to develop the electrostatic latent image formed on the image bearing member into a toner image;

a transfer member to which the toner image borne on the image bearing member is transferred;

a carrier collecting device that includes a rotatable sleeve disposed to face the image bearing member and a magnet non-rotatably disposed inside the sleeve, and collects the carrier on the image bearing member, a bias application unit that applies a bias including an AC voltage to the sleeve; and a controller that controls the bias application unit, wherein the sleeve is disposed downstream of a development position at which the electrostatic latent image formed on the image bearing member is developed and upstream of a transfer position at which the toner image borne on the image bearing member is transferred to the transfer member, in a rotation direction of the image bearing member, the controller controls the bias application unit to apply a first bias to the sleeve during the image forming operation, and controls the bias application unit to apply a second bias to the sleeve in a predetermined mode during non-image forming, and when, in one period of the AC voltage of the bias applied to the sleeve by the bias application unit, a duration of a voltage of a reverse polarity to a charging polarity of the toner with respect to a DC potential of the sleeve is t1, a duration of a voltage of a same polarity as the charging polarity of the toner with respect to the DC potential of the sleeve is t2, and a ratio of t1 with respect to one period (t1+t2) of an AC voltage of the bias applied to the sleeve by the bias application unit is a duty ratio, a duty ratio of the AC voltage of the second bias is lower than 50%.

13. The image forming apparatus according to claim 12, wherein the duty ratio of the AC voltage of the second bias is 40% or less.

14. The image forming apparatus according to claim 12, wherein a duty ratio of the AC voltage of the first bias is 50%.

15. The image forming apparatus according to claim 12, wherein the controller controls the bias application unit to alternately apply the second bias and a third bias to the sleeve in the predetermined mode, and a duty ratio of the AC voltage of the third bias is higher than 50%.

16. The image forming apparatus according to claim 15, wherein the duty ratio of the AC voltage of the second bias is 40% or less, and the duty ratio of the AC voltage of the third bias is 60% or more.

17. The image forming apparatus according to claim 12, wherein in the predetermined mode, an absolute value of the DC potential of the sleeve is the same as an absolute value of a DC potential of the image bearing member.

18. The image forming apparatus according to claim 12, wherein during the image forming operation, a polarity of a DC potential of the image bearing member and a polarity of the DC potential of the sleeve are the same as the charging polarity of the toner, and an absolute value of the DC potential of the sleeve is larger than an absolute value of the DC potential of the image bearing member.

19. The image forming apparatus according to claim 12, wherein the first bias is a bias that is superimposed with a DC voltage and the AC voltage, and the second bias is a bias that consists of the AC voltage only.

* * * * *